United States Patent
Farmer et al.

(10) Patent No.: US 12,529,000 B2
(45) Date of Patent: Jan. 20, 2026

(54) METHODS FOR PRODUCING REDUCED CARBON FOOTPRINT BIOFUELS

(71) Applicant: Locus Solutions IPCo, LLC, Solon, OH (US)

(72) Inventors: Sean Farmer, Ft. Lauderdale, FL (US); Paul Zorner, Encinitas, CA (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 0 days.

(21) Appl. No.: 18/010,882

(22) PCT Filed: Sep. 2, 2022

(86) PCT No.: PCT/US2022/042428
§ 371 (c)(1),
(2) Date: Dec. 16, 2022

(87) PCT Pub. No.: WO2023/034554
PCT Pub. Date: Mar. 9, 2023

(65) Prior Publication Data
US 2024/0117260 A1    Apr. 11, 2024

Related U.S. Application Data

(60) Provisional application No. 63/240,095, filed on Sep. 2, 2021.

(51) Int. Cl.
| | |
|---|---|
| C10L 1/02 | (2006.01) |
| A01C 21/00 | (2006.01) |
| A01G 22/20 | (2018.01) |
| A01G 22/40 | (2018.01) |
| A01N 63/22 | (2020.01) |
| A01N 63/30 | (2020.01) |
| A01N 63/38 | (2020.01) |
| A01P 21/00 | (2006.01) |
| C11C 3/00 | (2006.01) |
| C12P 7/04 | (2006.01) |
| C12P 7/06 | (2006.01) |
| C12P 7/16 | (2006.01) |

(52) U.S. Cl.
CPC ............. *C10L 1/026* (2013.01); *A01C 21/00* (2013.01); *A01G 22/20* (2018.02); *A01G 22/40* (2018.02); *A01N 63/22* (2020.01); *A01N 63/30* (2020.01); *A01N 63/38* (2020.01); *A01P 21/00* (2021.08); *C11C 3/003* (2013.01); *C12P 7/04* (2013.01); *C12P 7/06* (2013.01); *C12P 7/16* (2013.01)

(58) Field of Classification Search
None
See application file for complete search history.

(56) References Cited

U.S. PATENT DOCUMENTS

| | | |
|---|---|---|
| 7,429,477 B2 | 9/2008 | Johnson |
| 8,148,138 B2 | 4/2012 | Johnson |
| 8,598,083 B2 * | 12/2013 | Kaminskyj ............. C05F 11/08 |
| | | 435/945 |
| 10,609,938 B2 | 4/2020 | Hristov |
| 2007/0250961 A1 * | 10/2007 | Blaylock ................. C12P 7/08 |
| | | 800/283 |
| 2008/0318777 A1 | 12/2008 | Lin et al. |
| 2010/0120104 A1 | 5/2010 | Reed |
| 2010/0254957 A1 | 10/2010 | Hua |
| 2011/0252696 A1 | 10/2011 | Franklin et al. |
| 2012/0003705 A1 * | 1/2012 | Jin ........................... F23J 15/02 |
| | | 435/167 |
| 2012/0266823 A1 | 10/2012 | Harttung |
| 2014/0201870 A1 | 7/2014 | Harman |
| 2016/0040119 A1 * | 2/2016 | Hashman ................ B09C 1/105 |
| | | 424/93.46 |
| 2016/0083684 A1 | 3/2016 | Li et al. |
| 2016/0345588 A1 | 12/2016 | Johnson |
| 2016/0374364 A1 * | 12/2016 | Lee ........................ A23K 10/12 |
| | | 426/53 |
| 2017/0224745 A1 | 8/2017 | Dart |
| 2018/0242511 A9 | 8/2018 | Fabbri et al. |
| 2018/0272396 A1 * | 9/2018 | Farmer .................. C12N 1/205 |
| 2019/0039964 A1 * | 2/2019 | Temme .................. C12N 1/205 |
| 2019/0174692 A1 | 6/2019 | Harman et al. |
| 2019/0177754 A1 | 6/2019 | Lippmeier et al. |
| 2020/0275617 A1 * | 9/2020 | Fabijanski ............. B01D 53/84 |

FOREIGN PATENT DOCUMENTS

| | | |
|---|---|---|
| CN | 104920812 A | 9/2015 |
| CN | 106045772 A | 10/2016 |
| WO | 2007072848 A1 | 6/2007 |
| WO | 2007072935 A1 | 6/2007 |
| WO | 2017044953 A1 | 3/2017 |

(Continued)

OTHER PUBLICATIONS

Mahyari, Z.F., et al., "Biodiesel production from slaughter wastes of broiler chicken: a potential survey in Iran." SN Applied Sciences, 2021, 3(1): 1-13.

Abdullah, M. T., et al., "Biological control of Sclerotinia sclerotiorum (Lib.) de Bary with Trichoderma harzianum and Bacillus amyloliquefaciens." Crop Protection, 27.10 (2008): pp. 1354-1359.

Aboud, H. M., et al., "Interaction of Bacillus Subtilus and Trichoderma Harzianum with Mycorrhiza on Growth and Yield of Cucumber (*Cucumis sativus* L.)." International Journal of Current Research, 6.8 (2014): pp. 7754-7758.

(Continued)

*Primary Examiner* — Ali Z Fadhel
(74) *Attorney, Agent, or Firm* — BENESCH, FRIEDLANDER, COPLAN & ARONOFF LLP

(57) ABSTRACT

The subject invention provides compositions and methods for reducing the carbon footprint of producing biofuels. Microbe-based soil treatment compositions are utilized to reduce greenhouse gas emissions resulting from the agricultural practices of producing feedstock crops.

20 Claims, No Drawings

(56) References Cited

FOREIGN PATENT DOCUMENTS

| | | | |
|---|---|---|---|
| WO | 2017089641 A1 | 6/2017 |
| WO | 2018049182 A2 | 3/2018 |
| WO | 2018129299 A1 | 7/2018 |
| WO | 2019023034 A3 | 1/2019 |
| WO | 2019046968 A1 | 3/2019 |
| WO | 2019133923 A1 | 7/2019 |
| WO | 2019217548 A1 | 11/2019 |
| WO | 2020069166 A1 | 4/2020 |
| WO | 2020076797 A1 | 4/2020 |
| WO | 2020076800 A1 | 4/2020 |
| WO | 2020210074 A1 | 10/2020 |

OTHER PUBLICATIONS

Alexis, Z. P., et al., "Effect of soil amendment with Trichoderma harzianum and Bacillus amyloliquefaciens bioformulation on biochemical parameters and antioxidant activity in Abelmoshchus esculentus." International Journal of Innovation and Applied Studies, 33.3 (2021): pp. 522-535.

Baltzoi, P., et al., "Effect of Symbiotic Microorganisms on Turfgrass under Two Irrigation Regimes." International Journal of Plant & Soil Science, 8.2 (2015): pp. 1-9.

De Boer, W., et al., "Living in fungal world: impact of fungi on soil bacterial niche development." FEMS Microbiology Reviews, 29.4 (2005): pp. 795-811.

Gerber, P. J., et al., "Tackling climate change through livestock—A global assessment of emissions and mitigation opportunities." Food and Agriculture Organization of the United Nations, (2013), pp. 1-115.

Locus: "Rhizolizer (TM) Soil Amendment." Retrieved from Internet: Mar. 9, 2018, <https://locusag.com/wpcontent/uploads/2018/3/Locus_AG_Rhizolizer_labels_FLORIDA.pdf> pp. 1-2.

Malusa, E., et al., "Technologies for Beneficial Microorganisms Inocula Used as Biofertilizers." The Scientific World Journal, 2012.1 (2012): 491260 pp. 1-12.

Patakioutas, G., et al., "Turfgrass root system inoculation and colonization by a mycorrhizal fungus and other symbiotic microorganisms and evaluation of its effects on green turf cover and growth." XXIX International Horticultural Congress on Horticulture: Sustaining Lives, Livelihoods and Landscapes (IHC2014): III, 1122. (2014): pp. 65-72.

Peters, A., "These probiotics for plants help farms suck up extra carbon dioxide"—Fast Company. Fast Company. https://www.fastcompany.com/90303108/these-probiotics-for-plants-help-farms-suck-up-extra-carbon-dioxide, (Feb. 7, 2019): pp. 1-12.

Samaniego-Gamez, B. Y., et al., "*Bacillus* spp. inoculation improves photosystem II efficiency and enhances photosynthesis in pepper plants." Chilean Journal of Agricultural Research, 76.4 (2016): pp. 409-416.

Vinale, F., et al., "Harzianic Acid, an Antifungal and Plant Growth Promoting Metabolite from Trichoderma harzianum." Journal of Natural Products, 72.11 (2009): pp. 2032-2035.

Wu, S., et al., "Mitigation of nitrous oxide emissions from acidic soils by Bacillus amyloliquefaciens, a plant growth-promoting bacterium." Global Change Biology, 24.6 (2018): pp. 2352-2365.

* cited by examiner

METHODS FOR PRODUCING REDUCED CARBON FOOTPRINT BIOFUELS

CROSS-REFERENCE TO RELATED APPLICATION

This application is a National Stage Application of International Application No. PCT/US2022/042428, filed Sep. 2, 2022; which claims priority to U.S. Provisional Patent Application Ser. No. 63/240,095, filed Sep. 2, 2021, both of which are incorporated herein by reference in their entirety.

BACKGROUND OF THE INVENTION

"Greenhouse gases" or "GHG" are gases that trap heat in the atmosphere and include carbon dioxide, methane, nitrous oxide and fluorinated gases (EPA report 2016 at 6). A "carbon footprint" is the total GHG emissions generated indirectly and directly by an organization, event, individual, place, or product. It is calculated by summing the emissions resulting from every stage of a product or service's lifetime (material production, manufacturing, use, and end-of-life). Throughout a product's lifetime, or lifecycle, different GHGs may be emitted, each having a greater or lesser ability to trap heat in the atmosphere. These differences are accounted for by calculating the global warming potential (GWP) of each gas in units of carbon dioxide equivalents ($CO_2e$), giving carbon footprints a single unit for easy comparison (Michigan 2020).

Based on recent measurements from monitoring stations around the world and measurement of older air from air bubbles trapped in layers of ice from Antarctica and Greenland, global atmospheric concentrations of GHGs have risen significantly over the last few hundred years (EPA report 2016 at, e.g., 6, 15).

Especially since the Industrial Revolution began in the 1700s, human activity has contributed to the amount of GHGs in the atmosphere by burning fossil fuels, cutting down forests, and conducting other activities. Many GHGs emitted into the atmosphere remain there for long periods of time ranging from a decade to many millennia. Over time these gases are removed from the atmosphere by chemical reactions or by emissions sinks, such as the oceans and vegetation that absorb GHGs from the atmosphere.

World leaders have attempted to encourage a reduction in GHG emissions and/or reduce the carbon footprint of various activities through treaties and other inter-state agreements. One such attempt is through the use of carbon credit systems. A carbon credit is a generic term for a tradable certificate or permit typically representing the right to emit one ton of carbon dioxide, or an equivalent GHG. In a typical carbon credit system, a governing body sets a quota on the amount of GHG emissions an operator can produce. Exceeding these quotas requires the operator to purchase extra allowances from other operators who have not used all their carbon credits.

A goal of carbon credit systems is to encourage companies to invest in more green technology, machinery and practices in order to benefit from the trade of these credits. Under the Kyoto Protocol of the United Nations Framework Convention on Climate Change (UNFCCC), many countries have agreed to be bound internationally by policies for GHG reduction, including through trade of emissions credits. While the United States is not bound by the Kyoto Protocol, and while there is no central national emissions trading system in the U.S., some states, such as California and a group of northeastern states, have begun to adopt such trading schemes.

One area in industry that has a significant carbon footprint is the production and use of fossil fuels for providing electrical power and powering automobiles, planes and ships. Replacing fossil fuels with biofuels—fuels produced from renewable organic material—has the potential to reduce some undesirable aspects of fossil fuel production and use, including conventional and greenhouse gas (GHG) pollutant emissions, exhaustible resource depletion, and dependence on unstable foreign suppliers. Demand for biofuels could also increase farm income.

The two most common biofuels are bioethanol and biodiesel. Bioethanol is an alcohol producing as a result of microbial fermentation of starches and sugars from plant matter, such as, for example, corn, sugarcane, switchgrass, and sweet sorghum. Ethanol can be used in petrol engines to replace gasoline or mixed with gasoline at varying percentages. Biodiesels are produced from plant oils (e.g., soybean), animal fats or used cooking oils through transesterification. The resulting fuel can be burned on its own or in varying degrees of mixture with petroleum-based diesel fuel for powering diesel engines.

While it seems that use of renewable resources with lower GHG-emitting properties would be ideal, because many biofuel feedstocks require land, water, and other resources, research suggests that biofuel production may give rise to several undesirable effects. For example, air pollution is still a concern when it comes to biofuel production. Agricultural equipment and transportation vehicles are sources of GHG emissions. Additionally, changes to land use patterns may increase GHG emissions, put pressure on water resources, create air and water pollution, and introduce competition in ways that increase food costs Additionally, higher carbon footprint practices, such as deforestation and peatland drainage, are common in biofuel feedstock production. In some parts of the world, large areas of natural vegetation and forests have been cleared and burned to grow, for example, soybeans and palm oil trees, for making biodiesel. Thus, over time, the result may be a negative environmental effect that exceeds the potential benefits of using biofuels.

Other environmental disadvantages of biofuels include regional suitability and fertilizer use. Every plant has an ideal growing condition where water supply, temperature, and sunlight make a hospitable climate for growth. The zones where biofuel plants can grow readily tend to be areas such as rainforests, peatlands, savannahs, or grasslands. These areas are known for their biodiversity in plants and are very useful in controlling the GHG emission every year. The reduction in biodiversity in these areas to produce ethanol and biodiesel in Brazil, Indonesia, Malaysia, or the United States may release as much carbon dioxide into the air as those biofuels save annually by replacing fossil fuels. Additionally, growing biofuel crops requires fertilizer usage, which can increase GHG through transport, development and release from soil.

Considering the current rate of fossil fuel consumption, many sources predict that fossil fuels will run out in the foreseeable future. This creates a pressing need for fossil fuel alternatives. Biofuels can be used to fill this need, but first, the carbon footprint resulting from biofuel production must be managed and reduced.

BRIEF SUMMARY OF THE INVENTION

The subject invention provides environmentally-friendly methods for the production of biofuels. The subject invention further provides microbe-based products, as well as uses for these products, for achieving beneficial results in many settings within the biofuel production chain of operation, including in, for example, feedstock production and transportation. Advantageously, in preferred embodiments, the subject invention utilizes organic, non-GMO components and environmentally-friendly methods to reduce the carbon footprint of biofuel production.

In certain embodiments, the methods of the subject invention facilitate the production of biofuels, including bioalcohols and biodiesel, in a manner that reduces the GHG emissions resulting therefrom, including GHGs such as carbon dioxide, methane and nitrous oxide. In certain embodiments, the subject invention also provides reduced-carbon footprint biofuels produced according to the subject methods.

In certain embodiments, the subject invention provides strategies for reducing the carbon footprint and improving the sustainability of biofuels, including reducing agricultural inputs to production, use of low-carbon footprint resources to supply energy required to convert feedstock into biofuels, and/or employing supply chain optimization to reduce emissions from growth and transportation of feedstock materials.

In preferred embodiments, the methods comprise an agricultural aspect, in which reduced carbon footprint biofuel feedstocks are grown. In certain embodiments, the methods can also comprise an animal husbandry aspect, for example, in the context of producing feedstocks for biodiesel. Additionally, in preferred embodiments, the methods comprise a production aspect, in which the plant and/or animal-based feedstocks are harvested and converted into biofuels.

In one embodiment, the agricultural aspect comprises applying a microbe-based soil treatment composition to a tract of farmland utilized for producing biofuel feedstocks, including tracts cleared by deforestation, natural fire and prescribed burns, wherein the soil treatment composition provides one or more direct or indirect benefits to the plants and/or soil of the farmland. These benefits can include, for example, improved plant health and growth (both above- and below-ground), improved plant protein and/or nutrient content, reduced fertilizer usage, enhanced sequestration of carbon in the soil, improved soil microbiome diversity, improved water and/or nutrient dispersion in the soil, and/or increased soil nutrient uptake by plant roots.

In certain embodiments, the soil treatment composition comprises one or more beneficial microorganisms. In preferred embodiments, the beneficial microorganisms are non-pathogenic, soil-colonizing fungi, yeasts and/or bacteria capable of producing one or more of the following: surface active agents, such as lipopeptides and/or glycolipids; bioactive compounds with antimicrobial and immune-modulating effects; polyketides; acids; peptides; anti-inflammatory compounds; enzymes, such as proteases, amylases, and/or lipases; and sources of amino acids, vitamins, and other nutrients.

In preferred embodiments, the microorganism is a non-pathogenic bacterium, yeast and/or fungus selected from, for example, *Trichoderma* spp., *Bacillus* spp., *Wickerhamomyces anomalus, Myxococcus xanthus, Pseudomonas chlororaphis, Starmerella bombicola, Saccharomyces boulardii, Pichia occidentalis, Pichia kudriavzevii, Meyerozyma guilliermondii*, mycorrhizal fungi, nitrogen fixers (e.g., *Azotobacter vinelandii, Meyerozyma* sp.) and/or potassium mobilizers (e.g., *Frateuria aurantia*).

The species and ratio of microorganisms and other ingredients in the composition can be determined according to, for example, the geographic region where treatment will occur, the species of livestock animals) that will consume the plants, the health status of the farmland at the time of treatment, as well as other factors. Thus, the composition can be customized for any given location.

In certain exemplary embodiments, the soil treatment composition comprises *Bacillus subtilis* B4 (NRRL B-68031), growth by-products thereof, and, optionally, one or more sources of nutrients.

In certain exemplary embodiments, the soil treatment composition comprises *Wickerhamomyces anomalus* (e.g., NRRL Y-68030), growth by-products thereof, and, optionally, one or more sources of nutrients.

In certain exemplary embodiments, the soil treatment composition comprises a *Meyerozyma* spp. yeast (e.g., *M. guilliermondii, Meyerozyma* sp. MEC14XN (a.k.a. *M. caribbica* subsp. *Locus*)), growth by-products thereof, and, optionally, one or more sources of nutrients.

In certain exemplary embodiments, the soil treatment composition comprises a first microorganism and a second microorganism, growth by-products thereof, and, optionally, one or more sources of nutrients. In a specific exemplary embodiment, the first microorganism is *Trichoderma harzianum* and the second microorganism is *Bacillus amyloliquefaciens* (e.g., *B. amyloliquefaciens* NRRL B-67928).

In one embodiment, the soil treatment composition further comprises microbial growth by-products, which can include, for example, the fermentation medium in which the microbes were cultivated, and/or any leftover nutrients from cultivation. The growth by-products can further include metabolites or other biochemicals produced as a result of cell growth, including, for example, biosurfactants, enzymes and/or solvents.

The methods can further comprise applying materials to enhance microbe growth during application (e.g., adding germination enhancers, prebiotics and/or nutrients to promote plant and/or microbial growth). In one embodiment, the nutrient sources can include, for example, sources of magnesium, phosphate, nitrogen, potassium, selenium, calcium, sulfur, iron, copper, zinc, proteins, vitamins and/or carbon. In one embodiment, prebiotics can include, for example, one or more of kelp extract, fulvic acid, chitin, biochar, humate and humic acid.

In some embodiments, the method of the subject invention further comprises applying additional agricultural components, such as, for example, herbicides, fertilizers, pesticides and/or soil amendments. Preferably, the additional components are non-toxic and environmentally-friendly. The exact materials and the quantities thereof can be determined by a soil scientist having, the benefit of the current disclosure.

In certain embodiments, the soil treatment composition is contacted with a plant part. In a specific embodiment, the composition is contacted with one or more roots of the plant. The composition can be applied directly to the roots, e.g., by spraying or dunking the roots, and/or indirectly, e.g., by administering the composition to the soil in which the plant grows (e.g., the rhizosphere). The composition can be applied to the seeds of the plant prior to or at the time of planting, or to any other part of the plant and/or its surrounding environment.

The methods of the subject invention can utilize standard methods and equipment that are used for maintenance of farmland. For example, the soil treatment composition can be applied in liquid form using an irrigation system. Additionally, the composition can be applied using a manual spreader, such as a broadcast spreader, a drop spreader, a handheld spreader, or a handheld sprayer.

In some embodiments, the farmland is used to produce a feedstock crop, such as, for example, corn, switchgrass, miscanthus, sugar cane, sweet sorghum, poplar, willow, camelina, soy, grasses, and/or palm.

In some embodiments, the farmland is used to produce a livestock feed crop, or pastureland vegetation, for example, bluegrasses, Bermuda grasses, fescues, buffalo grasses, forbs, weeds, shrubs, corn, oats and barley.

In some embodiments, the composition can be applied to farmland, pastures, ranges, or forests to promote the growth of other plants not intended for harvest in order to offset the carbon impact of producing biofuels.

In some embodiments, biofuel feedstock crops and/or livestock feed crops can be planted on degraded or abandoned agricultural land to offset the carbon impact of biofuel production.

In some embodiments, the composition can be applied to rangelands where, in some cases, prescribed burns have been performed to promote revegetation. In some embodiments, the composition can be applied to forest land that has been cleared by deforestation to promote reforestation.

In one embodiment, the agricultural aspect of the method can increase the value of plant and animal-based feedstocks compared with conventionally-grown, high carbon footprint feedstocks that are produced and/or harvested for producing biofuels.

Additionally, the subject invention can reduce the carbon footprint of the biofuel industry by reducing land use change, reducing the manufacture and use of fertilizers and pesticides, and reducing the operation of fossil fuel burning agricultural machinery, including that used for processing and transport of feedstock and animal by-products used in biofuel production.

This can be achieved by, for example, enhancing vegetative carbon utilization and storage in tracts of farmland, increasing carbon sequestration in soil, reducing soil-based GHG emissions, improving agricultural nitrogen-based fertilization practices, improving biodiversity in soil microbiota, and improving agricultural soil management.

In certain embodiments, enhanced vegetative carbon utilization can be in the form of, for example, increased foliage in plants, increased stem and/or trunk diameter, enhanced root growth, and/or increased numbers of plants per unit of area.

In certain embodiments, increased soil sequestration can be in the form of, for example, increased growth of plant roots (e.g., length and density), increased uptake by microorganisms of organic compounds secreted by plants (including secretions from plant roots), and improved microbial colonization of soil.

In certain embodiments, the methods can reduce the amount of GHG such as methane, carbon dioxide and/or nitrous oxide/precursors thereof emitted from soil.

In certain embodiments, improved agricultural fertilization practices, soil biodiversity, and/or soil management can be in the form of a reduction in the use of nitrogen-rich fertilizers, as well as inoculation of a plant's rhizosphere with one or more beneficial microorganisms. For example, in preferred embodiments, the microbes of the soil treatment composition can colonize the rhizosphere and provide multiple benefits to a plant whose roots are growing therein, including protection, hydration and nourishment. Thus, the methods can reduce nitrous oxide emissions by replacing some or all fertilizers, pesticides, and/or other soil amendments with one or more beneficial soil microorganisms.

In certain embodiments, when utilizing animal by-products in the production of bio-diesel, the method can further comprise an animal husbandry aspect. Preferably, the animal husbandry aspect comprises making the plants produced according to the agricultural aspect available to a livestock animal such that the livestock animal ingests the plants. In one embodiment, the livestock animal is placed on a tract of farmland treated according to the agricultural aspect for free-range grazing. In one embodiment, the plants are harvested from treated farmland and provided to the animal as reduced-carbon footprint fodder, grain and/or other forms of loose feed.

In one embodiment, a combination of feeding methods is utilized, for example, as is customary when producing grain-finished livestock.

In one embodiment, the animal husbandry aspect of the method reduces the carbon footprint of the livestock industry by enhancing the health and/or productivity of livestock animals in ways that reduce GHG emissions resulting from digestion, manure and large-scale production of livestock. Advantageously, this can reduce the carbon footprint of obtaining animal fats such as beef tallow, pork lard, and chicken fat from slaughtered animals, which is used for producing biodiesel and other fuels.

In certain embodiments, the method can further comprise a production aspect. Preferably, the production aspect comprises harvesting the feedstock, either from a tract of land treated according to the subject methods, or from livestock fed with plant matter grown using the same. The harvested feedstock is then converted into a biofuel component, for example, via fermentation of feedstock into bioalcohols such as ethanol, butanol and/or propanol, extracting of feedstock from plant matter in the form of vegetable oil, or extracting feedstock from slaughtered livestock in the form of animal fat. In certain embodiments, the biofuel component is mixed with a carrier, such as water or a fossil fuel, to produce a biofuel.

In certain embodiments, the method can further comprise a transportation aspect. Preferably, the transportation aspect comprises utilizing a biofuel produced during the production aspect to power agricultural equipment and vehicles utilized in the production of crops and livestock, and for carrying the biofuels that are produced to other end users.

In certain embodiments, the subject invention provides reduced-carbon footprint biofuels produced according to the methods of the subject methods. In one embodiment, the reduced-carbon footprint biofuel is a biofuel comprising an alcohol obtained from the fermentation of feedstock produced according to the subject methods. In one embodiment, the reduced-carbon footprint biofuel is a biodiesel comprising fatty acid methyl esters produced from vegetable oil or animal fat obtained according to the subject methods.

In some embodiments, the methods of the subject invention can be utilized by a grower, livestock producer, livestock feed supplier, and/or biofuel feedstock supplied for reducing carbon credit usage. Thus, in certain embodiments, the subject methods can further comprise conducting measurements to assess the effect of the method on reducing the generation of methane, carbon dioxide and/or other deleterious atmospheric gases, and/or precursors thereof (e.g., nitrogen and/or ammonia) using standard techniques in the art.

Advantageously, in certain embodiments, the subject invention provides solutions that improve the environmental sustainability of producing and consuming biofuels by, for example, reducing land use change; promoting feedstock crop growth and vitality; improving the nutritional content of farmland soils; promoting improved soil moisture and water use efficiency; enhancing soil microbiome diversity;

reducing fertilizer usage; increasing the feedstock value of grasses while reducing grain dependency; reducing enteric GHG emissions from livestock animals and manure; improving feed to muscle conversion; improving productivity of livestock animals, e.g., quantity and nutritional quality of meat and milk; and others.

DETAILED DESCRIPTION OF THE INVENTION

The subject invention provides environmentally-friendly methods for producing reduced-carbon footprint biofuels, wherein the method comprises, at least, an agricultural aspect and a production aspect, wherein:
the agricultural aspect comprises treating farmland in which plants for biofuel feedstock are, or will be, grown using techniques that enhance soil nutrient and moisture content and dispersion, enhance plant health and growth, improve plant protein content, reduce nitrogen-rich fertilizer usage, and/or enhance carbon sequestration in soil and/or plant matter; and
the production aspect comprises harvesting the feedstock, converting the feedstock into one or more biofuel components, and producing a biofuel from the component(s),
wherein the agricultural aspect results in reduced GHG emissions compared with traditional agricultural techniques, and wherein, in preferred embodiments, the production aspect results in biofuels having a lower carbon footprint.

Advantageously, the subject invention can utilize organic, non-GMO components and environmentally-friendly methods to reduce the carbon footprint of livestock production.

A "carbon footprint" may be defined as a measure of the total amount of carbon dioxide ($CO_2$) and other GHGs emitted directly or indirectly by a human activity or accumulated over the full life cycle of a product or service. As just one example, a product that requires transportation over many miles by truck (e.g., a fossil fuel) may have a larger carbon footprint than an alternative product that does not require transportation (e.g., a locally-produced biofuel).

Carbon footprints can be calculated using a Life Cycle Assessment (LCA) method, or can be restricted to the immediately attributable emissions from energy use of fossil fuels. A life cycle assessment (LCA, also known as life cycle analysis, ecobalance, and cradle-to-grave analysis) is the investigation and valuation of the environmental impacts of a given product or service caused or necessitated by its existence. The life cycle concept of the carbon footprint means that it is all-encompassing and includes all possible causes that give rise to GHG emissions. In other words, all direct (on-site, internal) and indirect emissions (off-site, external, embodied, upstream, downstream) need to be taken into account.

Normally, a carbon footprint is expressed as a $CO_2$ equivalent. Carbon dioxide equivalency is a quantity that describes, for a given mixture and amount of GHG, the amount of $CO_2$ that would have the same global warming potential (GWP), when measured over a specified timescale (generally, 100 years). Carbon dioxide equivalency thus reflects time-integrated radiative forcing. The carbon dioxide equivalency for a gas is obtained by multiplying the mass and the GWP of the gas. The following units are commonly used:
a) By the UN climate change panel IPCC: billion metric tonnes of $CO_2$ equivalent ($GtCO_2$ eq);
b) In industry: million metric tonnes of carbon dioxide equivalents (MMTCDE);
c) For vehicles: g of carbon dioxide equivalents/km (gCDE/km).

For example, the GWP for methane is 21 and for nitrous oxide 310. This means that emissions of 1 million metric tonnes of methane and nitrous oxide, respectively, is equivalent to emissions of 21 and 310 million metric tonnes of carbon dioxide.

Various methods exist in the art for calculating or estimating carbon footprints and may be employed in the practice of the subject invention.

Advantageously, in preferred embodiments, the subject invention can be useful for reducing the carbon footprint of producing biofuels, which includes reducing the carbon footprint of producing plant-based biofuel feedstock, forage-based, fodder-based and/or grain-based feed for animal-based feedstock, and transportation thereof.

A "reduced carbon footprint" means a negative alteration in the amount of carbon dioxide and/or other GHGs emitted per unit time over the full life cycle of producing feedstock and producing biofuels with said feedstock, through and until a biofuel is ultimately used by human consumers. The negative alteration in $CO_2$ and/or other GHG emissions can be, for example, at least 0.25%, 0.5%, 1%, 5%, 10%, 15%, 20%, 25%, 30%, 35%, 40%, 45%, 50%, 55%, 60%, 65%, 70%, 75%, 80%, 85%, 90%, 95% or 100%.

In some embodiments, the term "carbon footprint" is interchangeable herein with the terms "carbon intensity" and "emission intensity." Emission intensity is the measure of the emission rate of a given GHG relative to the "intensity" of a specific activity or industrial process (e.g., burning of fuel, production of livestock animals, production of dishwashers). The emissions intensity can include the amount of emissions relative to, for example, the amount of fuel combusted, number of livestock animals produced, the amount of an industrial product produced, the total distance traveled, and/or the number of economic units generated.

Emissions intensity is measured across the entire life cycle of a product. For example, the emissions intensity of fuels is calculated by compiling all of the GHG emissions emitted along the supply chain for a fuel, including all the emissions emitted in exploration, mining, collecting, producing, transporting, distributing, dispensing and burning the fuel.

Selected Definitions

As used herein, "agriculture" means the cultivation and breeding of plants, algae and/or fungi for food, fiber, biofuel, medicines, cosmetics, supplements, ornamental purposes and other uses. According to the subject invention, agriculture can also include horticulture, landscaping, gardening, plant conservation, forestry and reforestation, pasture and prairie restoration, orcharding, arboriculture, and agronomy. Further included in agriculture are the care, monitoring and maintenance of soil.

As used herein, a "biofilm" is a complex aggregate of microorganisms, such as bacteria, wherein the cells adhere to each other and/or to a surface. The cells in biofilms are physiologically distinct from planktonic cells of the same organism, which are single cells that can float or swim in liquid medium.

As used herein, a "biofuel" is a fuel source produced from renewable organic material. Biofuels include "first generation" biofuels, made from sugar crops, starch crops, oilseed crops, and animal fats. Sugar and starch crops are converted through a fermentation process to form bioalcohols, include ethanol, butanol and propanol. Oils and animal fats can be into biodiesel.

Biofuels also include "second generation" biofuels, or cellulosic biofuels made from cellulosic non-food crops, crop residue and waste biomass. "Third generation" biofuels utilize algae as a feedstock.

As used herein, "conventional" agriculture and livestock production utilize one or more of: genetically-modified organisms (GMOs), concentrated animal feeding operations (CAFOs), and synthetic chemicals such as fertilizers, pesticides, and/or herbicides. Conventional agriculture and livestock production are typically highly resource and energy intensive, and can contribute to significant GHG emissions.

As used herein, the "digestive system" refers to the system of organs in an animal's body that enables digestion, or the consumption of food and conversion thereof to energy and waste. The digestive system can comprise, for example, an oral cavity, esophagus, crop, gizzard, proventriculus, stomach, rumen, reticulum, omasum, abomasum, pancreas, liver, small intestine, large intestine (colon), cecum, appendix, and/or anus. Additional organs or parts related to digestion and that are specific to a particular animal are also envisioned.

As used herein, "enhancing" means improving or increasing. For example, enhanced plant health means improving the plant's ability grow and thrive, which can include increased seed germination and/or emergence, improved ability to ward off pests and/or diseases, and improved ability to survive environmental stressors, such as droughts and/or overwatering Enhanced plant growth and/or enhanced plant biomass means increasing the size and/or mass of a plant both above and below the ground (e.g., increased canopy/foliar volume, height, trunk caliper, branch length, shoot length, protein content, root size/density and/or overall growth index), and/or improving the ability of the plant to reach a desired size and/or mass Enhanced yields mean improving the end products produced by the plants in a crop, for example, by increasing the number and/or size of fruits, leaves, roots and/or tubers per plant, and/or improving the quality of the fruits, leaves, roots and/or tubers (e.g., improving taste, texture, brix, chlorophyll content and/or color).

As used herein, "farmland" includes any tract of land in which plants are grown, cultivated and/or managed for human interests. Farmland includes:
  pastures, or land containing mostly grasses, legumes and/or non-grass herbaceous plants, that is grazed by livestock;
  meadows, which are typically ungrazed tracts of land that may be used for harvesting hay or other animal fodder;
  rangelands, which include untended and human-tended grasslands, shrublands, woodlands, wetlands and deserts that are grazed by domestic livestock or wild animals; and
  agricultural crops.

As used herein, "feedstock" means biomass and/or raw materials that are used to produce biofuels or biofuel components. Feedstock can include, for example, algal and aquatic biomass, animal fat, corn and other cereals, grasses and other woody or cellulosic crops, sugar-based crops, vegetable oil and waste vegetable oil. Specific, non-limiting examples of feedstock include canola, corn, sorghum, sunflower, camelina, rapeseed, soybean, safflower, fruits, sugarcane, cottonwood, crop residue, beef tallow, pork lard, chicken fat, corn stover, corn cobs, straw, wood, and municipal waste.

As used herein, "fodder" means any plant material that is harvested or otherwise cut for feeding livestock animals. Fodder can include, but is not limited to, grasses, forbs, shrubs, alfalfa, hay, straw, legumes, nuts, seeds, fruits, vegetables and/or crop residue.

As used herein, "forage" means any plant material that is growing in a tract of farmland and that is consumed by, or at least edible to, a livestock animal.

As used herein, "grain-fed" livestock refer to livestock animals that consume grains as part of their regular diet throughout the course of their life. The grains can comprise, for example, at least 10%, at least 25%, at least 50%, at least 75%, at least 85%, at least 95% or 100% of the animals' total feed supply. Grains include, but are not limited to, corn, oats, barley, wheat, sorghum, milo and soy.

In some embodiments, the grain-fed livestock is "grain-finished," meaning the livestock animals spend the majority of their lives grazing and/or eating grasses and forage-based feeds, but then spend the last 4 to 6 months, for example, eating a predominantly grain-based diet (e.g., more than 50%, 60%, 75%, or 90% of caloric intake). This grain-based diet often comprises high-energy grains, such as corn, wheat and milo; however, in some instances, the animals also consume other diverse feed sources in addition to the feedlot grains, such as potato hulls, sugar beets, and hay.

As used herein, "grass-fed" livestock means the livestock animal eats exclusively grasses and forage throughout its entire life, starting after weaning.

As used herein, an "isolated" or "purified" nucleic acid molecule, polynucleotide, polypeptide, protein, organic compound such as a small molecule (e.g., those described below), or other compound is substantially free of other compounds, such as cellular material, with which it is associated in nature. For example, a purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state. A purified or isolated microbial strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

A "metabolite" refers to any substance produced by metabolism (e.g., a growth by-product) or a substance necessary for taking part in a particular metabolic process. A metabolite can be an organic compound that is a starting material, an intermediate in, or an end product of metabolism. Examples of metabolites can include, but are not limited to, enzymes, toxins, acids, solvents, alcohols, proteins, carbohydrates, vitamins, minerals, microelements, amino acids, polymers, polyketides, and surfactants.

As used herein, a "methanogen" is a microorganism that produces methane gas as a by-product of metabolism. Methanogens are archaea that can be found in the digestive systems and metabolic waste of ruminant animals and non-ruminant animals (e.g., pigs, poultry and horses).

Examples of methanogens include, but are not limited to, *Methanobacterium* spp. (e.g., *M. formicicum*), *Methanobrevibacter* spp. (e.g., *M. ruminantium*), *Methanococcus* spp. (e.g., *M. paripaludis*), *Methanoculleus* spp. (e.g., *M. bourgensis*), *Methanoforens* spp. (e.g., *M. stordalenmirensis*), *Methanofollis liminatans, Methanogenium wolfei, Methanomicrobium* spp. (e.g., *M. mobile*), *Methanopyrus kandleri, Methanoregula boonei, Methanosaeta* spp. (e.g., *M. concilii, M. thermophile*), *Methanosarcina* spp. (e.g., *M. barkeri, M. mazeii*), *Methanosphaera stadtmanae, Methanospirillium hungatei, Methanothermobacter* spp., and/or *Methanothrix sochngenii*.

As used here, the term "plant" includes, but is not limited to, any species of woody, ornamental or decorative, crop or cereal, fruit or vegetable, fruit plant or vegetable plant, flower or tree, macroalga or microalga, phytoplankton and photosynthetic algae (e.g., green algae *Chlamydomonas reinhardtii*). "Plant" also includes a unicellular plant (e.g. microalga) and a plurality of plant cells that are largely differentiated into a colony (e.g. volvox) or a structure that is present at any stage of a plant's development. Such structures include, but are not limited to, a fruit, a seed, a shoot, a root, a stem, a leaf, a flower, etc. Furthermore, the plant can be standing alone, for example, in a lawn or garden, or it can be one of many plants, for example, as part of an orchard, forest or crop.

The term "plant tissue" includes differentiated and undifferentiated tissues of plants including those present in roots, shoots, leaves, pollen, seeds and tumors or galls, as well as cells in culture (e.g., single cells, protoplasts, embryos, callus, etc.). Plant tissue may be in planta, in organ culture, tissue culture, or cell culture. The term "plant part" as used herein refers to a plant structure or a plant tissue. Ranges provided herein are understood to be shorthand for all of the values within the range.

For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduction" means a negative alteration and "increase" means a positive alteration, wherein the positive or negative alteration is at least 0.25%, 0.5%, 1%, 5%, 10%, 15%, 20%, 25%, 30%, 35%, 40%, 45%, 50%, 55%, 60%, 65%, 70%, 75%, 80%, 85%, 90%, 95% or 100%.

As used herein, a "soil treatment," "soil amendment" or "soil conditioner" is any compound, material, or combination of compounds or materials that are added into soil to enhance the properties of the soil and/or rhizosphere. Soil amendments can include organic and inorganic matter, and can further include, for example, fertilizers, pesticides and/or herbicides. Nutrient-rich, well-draining soil is essential for the growth and health of plants, and thus, soil amendments can be used for enhancing the plant biomass by altering the nutrient and moisture content of soil. Soil amendments can also be used for improving many different qualities of soil, including but not limited to, soil structure (e.g., preventing compaction); improving the nutrient concentration and storage capabilities; improving water retention in dry soils; and improving drainage in waterlogged soils.

As used herein, "surfactant" refers to a compound that lowers the surface tension (or interfacial tension) between phases. Surfactants act as, e.g., detergents, wetting agents, emulsifiers, foaming agents, and dispersants. A "biosurfactant" is a surfactant produced by a living organism.

The transitional term "comprising," which is synonymous with "including," or "containing," is inclusive or open-ended and does not exclude additional, un-recited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Methods for Producing Reduced Carbon Footprint Biofuels

In certain embodiments, methods are provided that facilitate the production of biofuel feedstocks and conversion thereof into biofuels in a manner that reduces the GHG emissions resulting therefrom, including GHG such as, for example, carbon dioxide, methane and nitrous oxide.

In preferred embodiments, the methods comprise an agricultural aspect and a production aspect. In certain embodiments, the methods can also comprise an animal husbandry aspect and/or a transportation aspect.

Agricultural Aspect

In one embodiment, the agricultural aspect of the subject invention involves producing plant-based biofuel feedstock using techniques that result in reduced total GHG emissions when compared with GHGs emitted from feed production without these techniques.

More specifically, in certain embodiments, the agricultural aspect of the methods comprises applying a microbe-based soil treatment composition comprising one or more beneficial microorganisms and/or growth by-products thereof to a tract of farmland in which a feedstock plant is, or will be grown, wherein the soil treatment composition provides one or more direct or indirect benefits to the plants and/or soil in the farmland, and wherein the one or more benefits contribute to reduced GHG emissions from the cultivation and/or management of the farmland.

These benefits can include, for example, improved plant health and growth (both above- and below-ground), improved plant protein and/or nutrient content, improved soil microbiome diversity, improved water and/or nutrient dispersion in the soil, and/or increased nutrient uptake by plant roots.

In one embodiment, the agricultural aspect of the method reduces the carbon footprint of producing biofuel feedstock by enhancing vegetative carbon utilization and storage in tracts of farmland, increasing carbon sequestration in soil, reducing soil GHG emissions, improving agricultural nitrogen-based fertilization practices, improving biodiversity in soil microbiota, and/or improving agricultural soil management.

In certain embodiments, enhanced vegetative carbon utilization can be in the form of, for example, increased foliage in plants, increased stem and/or trunk diameter, enhanced root growth, and/or increased numbers of plants per unit of area.

In certain embodiments, increased soil carbon sequestration can be in the form of, for example, increased growth of plant roots (e.g., length and density), increased uptake by microorganisms of GHG precursors/organic compounds secreted by plants (including secretions from plant roots), and increased microbial colonization of soil.

In some embodiments, reducing soil GHG emissions includes reducing the amount of methane, carbon dioxide, and/or nitrous oxide/precursors thereof emitted from soil. For example, in some embodiments, this can be achieved through reduction of water stress and/or increase in water use efficiency of plants. Ample soil moisture leads to, for example, reduced soil temperature and increased nutrient transport to plants, both of which contribute to reduced soil respiration leading to GHG emissions and reduced free GHG precursor molecules in soil. Additionally, in some exemplary embodiments, the methods can facilitate water movement through soil, which prevents flooding and pooling of water that can lead to deoxygenation of soils and encourage growth of anaerobic methanogenic microbes.

In certain embodiments, improved agricultural fertilization practices, improved soil biodiversity, and/or improved soil management can be in the form of inoculating a plant's rhizosphere with one or more beneficial microorganisms. For example, in preferred embodiments, the microbes of the soil treatment composition can colonize the rhizosphere and provide multiple benefits to a plant whose roots are growing therein, including protection, hydration and nourishment. Thus, the methods can replace or reduce the use of nitrogen-rich fertilizers, pesticides, and/or other soil amendments that produce nitrous oxide precursors, such as nitrogen and ammonia.

Advantageously, the agricultural aspect can contribute to a reduced dependence on conventionally-grown crops that are produced, and transported, for producing biofuels. In some embodiments, this could enhance the marketability of biofuels to reduce dependence on non-renewable fuel sources.

The types of plants for which the subject methods can be useful include any plant species that is suitable as a feedstock for biofuels, either as a first-generation biofuel feedstock or a second-generation biofuel feedstock.

These include grasses such as, for example, annual bluegrass (*Poa annua*); annual ryegrass (*Lolium multiflorum*); Canada bluegrass (*Poa compressa*); Chewings fescue (*Festuca rubra*); colonial bentgrass (*Agrostis tenuis*); creeping bentgrass (*Agrostis palustris*); crested wheatgrass (*Agropyron desertorum*); fairway wheatgrass (*Agropyron cristatum*); hard fescue (*Festuca longifolia*); Kentucky bluegrass (*Poa pratensis*); orchardgrass (*Dactylis glomerate*); perennial ryegrass (*Lolium perenne*); red fescue (*Festuca rubra*); redtop (*Agrostis alba*); rough bluegrass (*Poa trivialis*); sheep fescue (*Festuca ovine*); smooth bromegrass (*Bromus inermis*); tall fescue (*Festuca arundinacea*); timothy (*Phleum pretense*); velvet bentgrass (*Agrostis canine*); weeping alkaligrass (*Puccinellia distans*); western wheatgrass (*Agropyron smithii*); Bermuda grass (*Cynodon* spp.); St. Augustine grass (*Stenotaphrum secundatum*); zoysia grass (*Zoysia* spp.); Bahia grass (*Paspalum notatum*); carpet grass (*Axonopus affinis*); centipede grass (*Eremochloa ophiuroides*); kikuyu grass (*Pennisetum clandesinum*); seashore paspalum (*Paspalum vaginatum*); floratam (*Stenotaphrum secundatum* "Floratam"); blue gramma (*Bouteloua gracilis*); buffalo grass (*Buchloe dactyloids*); sideoats gramma (*Bouteloua curtipendula*); foxtail; bromegrass; orchardgrass; quackgrass; and canarygrass;

And others, such as, for example, corn, wheat, sugar cane, sugar beet, soybean, canola, camelina, rapeseed, jatropha, mahua, mustard, flax, sunflower, safflower, palm, help, field pennycress, switchgrass, algae, miscanthus, oats, barley, rice, clover, poplar, willow, and timber.

In certain embodiments, the feedstock is a by-product of these plants that is typically separated from the feedstock crop before conversion to first-generation biofuels, such as, for example, distillers grains, brewer's spent grain, stalks, stems, leaves, bagasse, cobs, stover, cane trash, husks, shells, pods, and trimmings.

Animal Husbandry Aspect

In certain embodiments, the method comprises an animal husbandry aspect, which involves feeding livestock animals with by-products of feedstock crops that are produced according to the agricultural aspect.

In certain embodiments, the animal husbandry aspect involves feeding livestock animals that would be useful for producing animal fat-based feedstock for biofuel with plant matter produced according to the agricultural aspect.

More specifically, in certain embodiments, the animal husbandry aspect comprises making the plants produced according to the agricultural aspect, and/or byproducts thereof, available to a livestock animal such that the livestock animal ingests the plants. In one embodiment, the livestock animal is placed on farmland treated according to the agricultural aspect for free-range grazing.

In one embodiment, the plants are harvested from treated farmland and provided to the animal as reduced-carbon footprint fodder, grain and/or other forms of loose feed. Preferably, the distance required to transport the harvested plants and/or by-products thereof to the livestock is minimal, e.g., less than 10 miles. Even more preferably, in some embodiments, the harvested plants and/or by-products thereof are acquired from the same farmland on which the livestock roam and/or graze.

In one embodiment, a combination feeding method is utilized. For example, in some embodiments, the livestock is grain-finished, wherein the grazing farmland, as well as the grains and other feed sources on which the livestock animals are finished, are treated according to the agricultural aspect of the subject methods.

In some embodiments, the plant material produced according to the agricultural aspect is processed before being provided to a livestock animal. For example, in some embodiments, the plant material is fermented.

In one embodiment, the processed plant material is silage, the product of fermenting and storing foliage-based fodder, which can be used as a preserved livestock feed source during the winter months.

In one embodiment, the processed plant material is biofuel feedstock residue, the product of processing plant biomass into biofuel.

In one embodiment, the processed plant material is the by-product of fermenting grain to produce alcohol. In one embodiment, the processed grain is brewer's spent grain, the insoluble by-product of brewing barley. In one embodiment, the processed plant material is distiller's grain, the unfermented grain residue of distilling grains such as corn and rice. The distiller's grain can be further processed by drying to produce dried distiller's grains with solubles (DDGS), which is commonly used as a high protein feed additive for livestock.

"Livestock" animals, as used herein, are "domesticated" animals, meaning species that have been influenced, bred, tamed, and/or controlled over a sustained number of generations by humans, such that a mutualistic relationship exists between the animal and the human. Particularly, livestock animals include animals raised in an agricultural or industrial setting to produce commodities such as food, fiber and labor. Types of animals included in the term livestock can include, but are not limited to, alpacas, llamas, pigs (swine), horses, mules, asses, camels, dogs, ruminants, chickens, turkeys, ducks, geese, guinea fowl, and squabs.

In certain embodiments, the livestock animals are "ruminants," or mammals that utilize a compartmentalized stomach suited for fermenting plant-based foods prior to digestion with the help of a specialized gut microbiome. Ruminants include, for example, bovines, sheep, goats, ibex, giraffes, deer, elk, moose, caribou, reindeer, antelope, gazelle, impala, wildebeest, and some kangaroos.

In one embodiment, the livestock are fed microbes that reduce the production, by the animal of methane or other GHG.

In specific exemplary embodiments, the livestock animals are bovine animals, which are ruminant animals belonging to the subfamily Bovinae, of the family Bovidae. Bovine animals can include domesticated and/or wild species. Specific examples include, but are not limited to, water buffalo, anoa, tamaraw, auroch, banteng, guar, gayal, yak, kouprey, domestic meat and dairy cattle (e.g., *Bos taurus, Bos indicus*), ox, bullock, zebu, saola, bison, buffalo, wisent, bongo, kudu, kewwel, imbabala, kudu, nyala, sitatunga, and eland.

In certain embodiments, the livestock animals experience an increase in growth, muscularity, fertility and/or milk production as a result of ingesting the plants according to the subject methods. This can be due to, for example, increased protein content of the plants.

Production Aspect

In preferred embodiments, the methods of the subject invention comprise a production aspect, which involves the conversion of feedstock into biofuel and/or biofuel components.

Preferably, the production aspect comprises harvesting the feedstock from a tract of land treated according to the subject methods, from the by-products of first generation biofuel produced using the feedstock, and/or from livestock fed with plant matter grown using the subject methods.

The harvested feedstock is then converted into a biofuel component using, for example, thermochemical and/or biochemical processes, as well as optional purification of the biofuel.

In one embodiment, the feedstock is converted into biofuel via fermentation, wherein a microorganism processes sugars, starches and/or cellulose from the feedstock into fermentable sugars, followed by transforming the sugars into an alcohol by-product. The alcohol by-product, e.g., ethanol, methanol, propanol, isopropanol or butanol, is the biofuel product.

In one embodiment, wherein the feedstock is lipid-rich plant matter, the lipid-rich feed stock is extracted from the plant matter in the form of an oil and subjected to transesterification to produce fatty acid methyl esters (biodiesel). Waste vegetable oils from, for example, cooking, can also be converted into biofuel products.

In one embodiment, wherein the feedstock is waste fat from livestock animal carcasses, animal by-products are removed from the carcass and rendered into an oil by, for example, cooking until a liquid fat separates out. The remaining solids can be pressed further, for example, using a screw press, to complete the removal of the fat from the solid residue. Afterwards, the fat is subjected to transesterification to produce a biodiesel component comprising mostly fatty acid methyl esters.

In one embodiment, plant biomass and/or sewage feedstock can be anaerobically digested using microorganisms to produce hydrocarbon biogas biofuels. The biogas can comprise, for example, methane and carbon dioxide, as well as other gases. While these gases are typically considered greenhouse gases, they can be utilized for powering residential heating to industrial processes, and even compressed for use as a transportation fuel.

In certain embodiments, the biofuel product, e.g., the alcohols or fatty acid methyl esters, can be mixed with a carrier, such as water or a fossil fuel, to produce a finished biofuel product.

In certain embodiments, the fractions and residues leftover from biofuel production are not left for waste. For example, plant residue, in addition to serving as potential additional sources of feedstock for biofuels, can be used in building or construction materials; pulp or paper products; bio-char, bio-coal or other bio-solids; soil amendments and fertilizers; animal feeds; and/or biomass carbon for sequestration by other means. Due to their origin in biomass from within the biofuel supply chain, these products can be viewed as co-products of the primary biofuel for the purposes of lifecycle assessment of carbon intensity and sustainability performance.

In certain embodiments, the subject invention provides reduced-carbon footprint biofuels produced according to the methods of the subject methods. In one embodiment, the reduced-carbon footprint biofuel is a biofuel comprising an alcohol obtained from the fermentation of feedstock produced according to the subject methods. In one embodiment, the reduced-carbon footprint biofuel is a biodiesel comprising fatty acid methyl esters produced from vegetable oil or animal fat obtained according to the subject methods.

The biofuel products can be utilized as gasoline-bioalcohols mixtures, pure bioalcohols, biodiesel-diesel mixtures, biodiesel-water mixtures, pure biodiesels, and other suitable formulations for powering standard engines, diesel engines, marine engines, heaters, jet engines, generators, and heavy machinery.

Transportation Aspect

In certain embodiments, the method can, optionally, further comprise a transportation aspect. Preferably, the transportation aspect comprises utilizing a biofuel produced during the production aspect to power agricultural equipment and vehicles utilized in the production and transportation of crops and livestock, and for carrying the biofuels that are produced to other end users.

Soil Treatment Compositions

The subject method utilizes "microbe-based" compositions, meaning compositions that comprise components that were produced as the result of the growth of microorganisms or other cell cultures. Thus, a microbe-based composition or other cell cultures. Thus, a microbe-based composition may comprise the microbes themselves and/or by-products of microbial growth. The microbes may be in a vegetative state, in spore or conidia form, in hyphae form, in any other form of propagule, or a mixture of these. The microbes may be planktonic or in a biofilm form, or a mixture of both. The by-products of growth may be, for example, metabolites, cell membrane components, proteins, and/or other cellular components. The microbes may be intact or lysed. In preferred embodiments, the microbes are present, with growth medium in which they were grown, in the microbe-based composition. The microbes may be present at, for example, a concentration of at least $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$ or $1 \times 10^{13}$ or more CFU per gram or per ml of the composition.

The microorganisms of the subject compositions can be obtained through cultivation processes ranging from small to large scale. These cultivation processes include, but are not limited to, submerged cultivation/fermentation, solid state fermentation (SSF), and combinations thereof.

The composition may be, for example, at least, by weight, 1%, 5%, 10%, 25%, 50%, 75%, or 100% growth medium. The amount of biomass in the composition, by weight, may be, for example, anywhere from 0% to 100%, 10% to 75%, or 25% to 50%, inclusive of all percentages therebetween.

The product of fermentation may be used directly, with or without extraction or purification. If desired, extraction and purification can be easily achieved using standard extraction and/or purification methods or techniques described in the literature.

The microorganisms useful according to the subject invention can be, for example, non-plant-pathogenic, soil-colonizing strains of bacteria, yeast and/or fungi. The microorganisms may be in an active or inactive form, or in the form of vegetative cells, spores and/or any other form of propagule. The microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the beneficial microorganisms of the microbe-based soil treatment composition are non-pathogenic, soil-colonizing fungi, yeasts and/or bacteria capable of producing one or more of the following: surface active agents, such as lipopeptides and/or glycolipids; bioactive compounds with antimicrobial and immune-modulating effects; polyketides; acids; peptides; anti-inflammatory compounds; enzymes, such as proteases, amylases, and/or lipases; and sources of amino acids, vitamins, and other nutrients.

In one embodiment, the microorganism is a yeast or fungus. Yeast and fungus species suitable for use according to the current invention, include *Aureobasidium* (e.g., *A. pullulans*), *Blakeslea*, *Candida* (e.g., *C. apicola*, *C. bombicola*, *C. nodaensis*), *Cryptococcus*, *Debaryomyces* (e.g., *D. hansenii*), *Entomophthora*, *Hanseniaspora*, (e.g., *H. uvarum*), *Hansenula*, *Issatchenkia*, *Kluyveromyces* (e.g., *K. phaffii*), *Mortierella*, *Meyerozyma* (e.g., *M. guilliermondii*, *Meyerozyma* sp. MEC14XN (a.k.a. *M. caribbica* subsp. *Locus*), mycorrhizal fungi, *Penicillium*, *Phycomyces*, *Pichia* (e.g., *P. anomala*, *P. guilliermondii*, *P. occidentalis*, *P. kudriavzevii*), *Pleurotus* spp. (e.g., *P. ostreatus*), *Pseudozyma* (e.g., *P. aphidis*), *Saccharomyces* (e.g., *S. boulardii*, *S. cerevisiae*, *S. torula*), *Starmerella* (e.g., *S. bombicola*), *Torulopsis*, *Trichoderma* (e.g., *T. reesei*, *T. harzianum*, *T. hamatum*, *T. viride*), *Ustilago* (e.g., *U. maydis*), *Wickerhamomyces* (e.g., *W. anomalus*), *Williopsis* (e.g., *W. mrakii*), *Zygosaccharomyces* (e.g., *Z. bailii*), and others.

As used herein, "mycorrhizal fungi" includes any species of fungus that forms a non-parasitic mycorrhizal relationship with a plant's roots. The fungi can be ectomycorrhizal fungi and/or endomycorrhizal fungi, including subtypes thereof (e.g., arbuscular, ericoid, and orchid mycorrhizae).

Non-limiting examples of mycorrhizal fungi according to the subject invention include species belong to Glomeromycota, Basidiomycota, Ascomycota, Zygomycota, Helotiales, and Hymenochaetales, as well as *Acaulospora* spp. (e.g., *A. alpina*, *A. brasiliensis*, *A. foveata*), *Amanita* spp. (e.g., *A. muscaria*, *A. phalloides*), *Amphinema* spp. (e.g., *A. byssoides*, *A. diadema*, *A. rugosum*), *Astraeus* spp. (e.g., *A. hygrometricum*), *Byssocorticium* spp. (e.g., *B. atrovirens*), *Byssoporia terrestris* (e.g., *B. terrestris sartoryi*, *B. terrestris lilacinorosea*, *B. terrestris aurantiaca*, *B. terrestris sublutea*, *B. terrestris parksii*), *Cairneyella* spp. (e.g., *C. variabilis*), *Cantherellus* spp. (e.g., *C. cibarius*, *C. minor*, *C. cinnabarinus*, *C. friesii*), *Cenococcum* spp. (e.g., *C. geophilum*), *Ceratobasidium* spp. (e.g., *C. cornigerum*), *Cortinarius* spp. (e.g., *C. austrovenetus*, *C. caperatus*, *C. violaceus*), *Endogone* spp. (e.g., *E. pisiformis*), *Entrophospora* spp. (e.g., *E. coiorrhiarna*), *Funneliformis* spp. (e.g., *F. mosseae*), *Gamarada* spp. (e.g., *G. debralockiae*), *Gigaspora* spp. (e.g., *G. giganrean*, *G. margarzra*), *Glomus* spp. (e.g., *G. aggregatum*, *G. brasilianum*, *G. clarum*, *G. deserticola*, *G. etunicatum*, *G. fasciculatum* *G. intraradices*, *G. lamellosum*, *G. macrocarpum*, *G. monosporum*, *G. mosseae*, *G. versiforme*), *Gomphidius* spp. (e.g., *G. glutinosus*), *Hebeloma* spp. (e.g., *H. cylindrosporum*), *Hydnum* spp. (e.g., *H. repandum*), *Hymenoscyphus* spp. (e.g., *H. ericae*), *Inocybe* spp. (e.g., *I. bongardii*, *I. sindonia*), *Lactarius* spp. (e.g., *L. hygrophoroides*), *Lindtneria* spp. (e.g., *L. brevispora*), *Melanogaster* spp. (e.g., *M. ambiguous*), *Meliniomyces* spp. (e.g., *M. variabilis*), *Morchella* spp., *Mortierella* spp. (e.g., *M. polycephala*), *Oidiodendron* spp. (e.g., *O. maius*), *Paraglomus* spp. (e.g., *P. brasilianum*), *Paxillus* spp. (e.g., *P. involutus*), *Penicillium* spp. (e.g., *P. pinophilum*, *P. thomili*), *Peziza* spp. (e.g., *P. whitei*), *Pezoloma* spp. (e.g., *P. ericae*); *Phlebopus* spp. (e.g., *P. marginatus*), *Piloderma* spp. (e.g., *P. croceum*), *Pisolithus* spp. (e.g., *P. tinctorius*), *Pseudotomentella* spp. (e.g., *P. tristis*), *Rhizoctonia* spp., *Rhizodermea* spp. (e.g., *R. veluwensis*), *Rhizophagus* spp. (e.g., *R. irregularis*), *Rhizopogon* spp. (e.g., *R. luteorubescens*, *R. pseudoroseolus*), *Rhizoscyphus* spp. (e.g., *R. ericae*), *Russula* spp. (e.g., *R. livescens*), *Sclerocystis* spp. (e.g., *S. sinuosum*), *Scleroderma* spp. (e.g., *S. cepa*, *S. verrucosum*), *Scutellospora* spp. (e.g., *S. pellucida*, *S. heterogama*), *Sebacina* spp. (e.g., *S. sparassoidea*), *Setchelliogaster* spp. (e.g., *S. tenuipes*), *Suillus* spp. (e.g., *S. luteus*), *Thanatephorus* spp. (e.g.,

*T. cucumeris*), *Thelephora* spp. (e.g., *T. terrestris*), *Tomentella* spp. (e.g., *T. badia*, *T. cinereoumbrina*, *T. erinalis*, *T. galzinii*), *Tomentellopsis* spp. (e.g., *T. echinospora*), *Trechispora* spp. (e.g., *T. hymenocystis*, *T. stellulata*, *T. thelephora*), *Trichophaea* spp. (e.g., *T. abundans*, *T. woolhopeia*), *Tulasnella* spp. (e.g., *T. calospora*), and *Tylospora* spp. (e.g., *T. fibrillose*).

In certain embodiments, the subject invention utilizes endomycorrhizal fungi, including fungi from the phylum Glomeromycota and the genera *Glomus, Gigaspora, Acaulospora, Sclerocystis*, and *Entrophospora*. Examples of endomycorrhizal fungi include, but are not limited to, *Glomus aggregatum, Glomus brasilianum, Glomus clarum, Glomus deserticola, Glomus etunicatum, Glomus fasciculatum, Glomus intraradices (Rhizophagus irregularis), Glomus lamellosum, Glomus macrocarpum, Gigaspora margarita, Glomus monosporum, Glomus mosseae (Funneliformis mosseae), Glomus versiforme, Scutellospora heterogama*, and *Sclerocystis* spp.

In certain embodiments, the microorganisms are bacteria, including Gram-positive and Gram-negative bacteria. The bacteria may be, for example *Agrobacterium* (e.g., *A. radiobacter*), *Azotobacter* (*A. vinelandii, A. chroococcum*), *Azospirillum* (e.g., *A. brasiliensis*), *Bacillus* (e.g., *B. amyloliquefaciens, B. circulans, B. firmus, B. laterosporus, B. licheniformis, B. megaterium, B. mucilaginosus, B. coagulans, B. subtilis*), *Frateuria* (e.g., *F. aurantia*), *Microbacterium* (e.g., *M. laevaniformans*), myxobacteria (e.g., *Myxococcus xanthus, Stignatella aurantiaca, Sorangium cellulosum, Minicystis rosea*), *Pantoea* (e.g., *P. agglomerans*), *Pseudomonas* (e.g., *P. aeruginosa, P. chlororaphis* subsp. *aureofaciens* (*Kluyver*), *P. putida*), *Rhizobium* spp., *Rhodospirillum* (e.g., *R. rubrum*), *Sphingomonas* (e.g., *S. paucimobilis*), and/or *Thiobacillus thiooxidans* (*Acidothiobacillus thiooxidans*).

In certain exemplary embodiments, the soil treatment composition comprises *Bacillus subtilis* B4 (NRRL B-68031), growth by-products thereof, and, optionally, one or more sources of nutrients.

In certain exemplary embodiments, the soil treatment composition comprises *Wickerhamomyces anomalus* (e.g., NRRL Y-68030), growth by-products thereof, and, optionally, one or more sources of nutrients.

In certain exemplary embodiments, the soil treatment composition comprises a *Meyerozyma* spp. yeast (e.g., *M. guilliermondii*, *Meyerozyma* sp. MEC14XN (a.k.a *M. caribbica* subsp. *Locus*)), growth by-products thereof, and, optionally, one or more sources of nutrients.

In certain exemplary embodiments, the soil treatment composition comprises a first microorganism and a second microorganism, growth by-products thereof, and, optionally, one or more sources of nutrients. In a specific exemplary embodiment, the first microorganism is *Trichoderma harzianum* and the second microorganism is *Bacillus amyloliquefaciens* (e.g., *B. amyloliquefaciens* "B. amy" NRRL B-67928).

A culture of the *B. amyloliquefaciens* "B. amy" microbe has been deposited with the Agricultural Research Service Northern Regional Research Laboratory (NRRL), 1400 Independence Ave., S.W., Washington, DC, 20250, USA. The deposit has been assigned accession number NRRL B-67928 by the depository and was deposited on Feb. 26, 2020.

A culture of the *B. subtilis* B4 microbe has been deposited with the Agricultural Research Service Northern Regional Research Laboratory (NRRL), 1400 Independence Ave., S.W., Washington, DC, 20250, USA. The deposit has been assigned accession number NRRL B-68031 by the depository and was deposited on May 6, 2021.

A culture of *Wickerhamomyces anomalus* NRRL Y-68030 has been deposited with the Agricultural Research Service Northern Regional Research Laboratory (NRRL), 1400 Independence Ave., S.W., Washington, DC, 20250, USA. The deposit has been assigned accession number NRRL Y-68030 by the depository and was deposited on May 6, 2021.

Each of the subject cultures has been deposited under conditions that assure that access to the culture will be available during the pendency of this patent application to one determined by the Commissioner of Patents and Trademarks to be entitled thereto under 37 CFR 1.14 and 35 U.S.C 122. The deposit is available as required by foreign patent laws in countries wherein counterparts of the subject application, or its progeny, are filed. However, it should be understood that the availability of a deposit does not constitute a license to practice the subject invention in derogation of patent rights granted by governmental action.

Further, the subject culture deposit will be stored and made available to the public in accord with the provisions of the Budapest Treaty for the Deposit of Microorganisms, i.e., it will be stored with all the care necessary to keep it viable and uncontaminated for a period of at least five years after the most recent request for the furnishing of a sample of the deposit, and in any case, for a period of at least 30 (thirty) years after the date of deposit or for the enforceable life of any patent which may issue disclosing the culture. The depositor acknowledges the duty to replace the deposit should the depository be unable to furnish a sample when requested, due to the condition of the deposit. All restrictions on the availability to the public of the subject culture deposit will be irrevocably removed upon the granting of a patent disclosing it.

In one embodiment, the composition can comprise from 1 to 99% *Trichoderma* by weight and from 99 to 1% *Bacillus* by weight. In some embodiments, the cell count ratio of *Trichoderma* to *Bacillus* is about 1:100 to about 100:1, about 1:50, to about 50:1, about 1:25 to about 25:1, about 1:10 to about 10:1, 1:9 to about 9:1, about 1:8 to about 8:1, about 1:7 to about 7:1, about 1:6 to about 6:1, about 1:5 to about 5:1 or about 1:4 to about 4:1.

In one embodiment, the composition comprises about $1\times10^6$ to $1\times10^{12}$, $1\times10^7$ to $1\times10^{11}$, $1\times10^8$ to $1\times10^{10}$, or $1\times10^9$ CFU/ml of *Trichoderma*.

In one specific embodiment, the composition comprises about $1\times10^6$ to $1\times10^{12}$, $1\times10^7$ to $1\times10^{11}$, $1\times10^8$ to $1\times10^{10}$, or $1\times10^9$ CFU/ml of "*B. amy*" and/or B4.

In one specific embodiment, the composition comprises about $1\times10^6$ to $1\times10^{12}$, $1\times10^7$ to $1\times10^{11}$, $1\times10^8$ to $1\times10^{10}$, or $1\times10^9$ CFU/ml of *Wickerhamomyces anomalus* NRRL Y-68030.

In certain embodiments, the microorganism is one that is capable of fixing and/or solubilizing nitrogen, potassium, phosphorous and/or other micronutrients in soil.

In one embodiment, the microorganism is a nitrogen-fixing microorganism, or a diazotroph, selected from species of, for example, *Azospirillum, Azotobacter, Chlorobiaceae, Cyanothece, Frankia, Klebsiella*, rhizobia, *Trichodesmium*, and some Archaea. In a specific embodiment, the nitrogen-fixing bacterium is *Azotobacter vinelandii*. In another specific embodiment, the nitrogen-fixing microbe is *B. amy*, B4 or a *Meyerozyma* sp (e.g., *Meyerozyma* MEC14XN).

In another embodiment, the microorganism is a potassium-mobilizing microorganism, or KMB, selected from, for example, *Bacillus mucilaginosus, Frateuria aurantia* or

*Glomus mosseae*. In a specific embodiment, the potassium-mobilizing microorganism is *Frateuria aurantia*. In another specific embodiment, the potassium-mobilizing microorganism is *W. anomalus* NRRL Y-68030.

In certain embodiments, the microorganism is a phosphorous-mobilizing microorganism, for example, *Wickerhamomyces anomalus* NRRL Y-68030. This microbe produces beneficial organic acids and biosurfactants to help with nutrient and water mobilization, solubilization and absorption in soil. Additionally, *W. anomalus* produces the enzyme phytase, which mobilizes phosphates into usable forms of inorganic phosphorus. Furthermore, *W. anomalus* produces ethyl acetate, which can, in certain embodiments, break down biofilms such as those that are formed by many plant vascular bacterial pathogens.

Other specific examples of suitable microbes include, but are not limited to, *Pleurotus ostreatus, Debaryomyces hansenii, Saccharomyces cerevisiae, Saccharomyces boulardii*, and *Bacillus licheniformis*.

In a specific embodiment, the one or more microbes are present at a concentration of $1\times10^6$ to $1\times10^{12}$, $1\times10^7$ to $1\times10^{11}$, $1\times10^8$ to $1\times10^{10}$, or $1\times10^9$ CFU/ml each.

In one embodiment, the microorganisms of the subject composition comprise about 5 to 20% of the total composition by weight, or about 8 to 15%, or about 10 to 12%.

The species and ratio of microorganisms and other ingredients in the composition can be customized according to, for example, the plant being treated, the soil type where the plant is growing, the health of the plant at the time of treatment, as well as other factors.

In one embodiment, the combination of microorganisms applied to a plant and/or its surrounding environment is customized for a given plant and/or environment. Advantageously, in some embodiments, the combination of microbes works synergistically with one another to enhance plant health, growth and/or yields.

The microbes and microbe-based compositions of the subject invention have a number of beneficial properties that are useful for enhancing plant health, growth, and/or yields. For example, the compositions can comprise products resulting from the growth of the microorganisms, such as biosurfactants, proteins and/or enzymes, either in purified or crude form.

In one embodiment, the microorganisms of the subject composition are capable of producing a biosurfactant. In another embodiment, biosurfactants can be produced separately by other microorganisms and added to the composition, either in purified form or in crude form. Crude form biosurfactants can comprise, for example, biosurfactants and other products of cellular growth in the leftover fermentation medium resulting from cultivation of a biosurfactant-producing microbe. This crude form biosurfactant composition can comprise from about 0.001% to about 90%, about 25% to about 75%, about 30% to about 70%, about 35% to about 65%, about 40% to about 60%, about 45% to about 55%, or about 50% pure biosurfactant.

Biosurfactants form an important class of secondary metabolites produced by a variety of microorganisms such as bacteria, fungi, and yeasts. As amphiphilic molecules, microbial biosurfactants reduce the surface and interfacial tensions between the molecules of liquids, solids, and gases. Furthermore, the biosurfactants according to the subject invention are biodegradable, have low toxicity, are effective in solubilizing and degrading insoluble compounds in soil and can be produced using low cost and renewable resources. They can inhibit adhesion of undesirable microorganisms to a variety of surfaces, prevent the formation of biofilms, and can have powerful emulsifying and demulsifying properties. Furthermore, the biosurfactants can also be used to improve wettability and to achieve even solubilization and/or distribution of fertilizers, nutrients, and water in the soil.

Biosurfactants according to the subject methods can be selected from, for example, low molecular weight glycolipids (e.g., sophorolipids, cellobiose lipids, rhamnolipids, mannosylerythritol lipids and trehalose lipids), lipopeptides (e.g., surfactin, iturin, fengycin, arthrofactin and lichenysin), flavolipids, phospholipids (e.g., cardiolipins), and high molecular weight polymers such as lipoproteins, lipopolysaccharide-protein complexes, and polysaccharide-protein-fatty acid complexes.

The composition can comprise one or more biosurfactants at a concentration of 0.001% to 10%, 0.01% to 5%, 0.05% to 2%, and/or from 0.1% to 1% by weight.

Advantageously, in accordance with the subject invention, the soil treatment composition may comprise the medium in which each of the microorganisms were grown. The composition may be, for example, at least, by weight, 1%, 5%, 10%, 25%, 50%, 75%, or 100% growth medium.

The fermentation medium can contain a live and/or an inactive culture, purified or crude form growth by-products, such as biosurfactants, enzymes, and/or other metabolites, and/or any residual nutrients. The amount of biomass in the composition, by weight, may be, for example, anywhere from about 0.01% to 100%, about 1% to 90%, about 5% to about 80%, or about 10% to about 75%.

In one embodiment, different species of microorganism are grown separately and then mixed together to produce the soil treatment composition. In one embodiment, microorganisms can be co-cultivated, for example, *B. amyloliquefaciens* and *M. xanthus*.

In certain embodiments, the soil treatment composition comprises a germination enhancer for enhancing germination of spore-form microorganisms used in the soil treatment composition. In specific embodiments, the germination enhancers are amino acids, such as, for example, L-alanine and/or L-leucine. In one embodiment, the germination enhancer is manganese.

In one embodiment, the composition comprises one or more fatty acids. The fatty acids can be produced by the microorganisms of the composition, and/or produced separately and included as an additional component. In certain preferred embodiments, the fatty acid is a saturated long-chain fatty acid, having a carbon backbone of 14-20 carbons, such as, for example, myristic acid, palmitic acid or stearic acid. In some embodiments, a combination of two or more saturated long-chain fatty acids is included in the composition. In some embodiments, a saturated long-chain fatty acid can inhibit methanogenesis and/or increase cell membrane permeability of methanogens.

In one embodiment, the compositions comprise vitamins and/or minerals in any combination. Vitamins for use in a composition of this invention can include for example, vitamins A, E, K3, D3, B1, B3, B6, B12, C, biotin, folic acid, panthothenic acid, nicotinic acid, choline chloride, inositol and para-amino-benzoic acid. Minerals can include, for example, such as calcium, magnesium, phosphorus, potassium, sodium, chlorine, sulfur, chromium, cobalt, copper, iodine, iron, manganese, molybdenum, nickel, selenium, and zinc. Other components may include, but are not limited to, antioxidants, beta-glucans, bile salt, cholesterol, enzymes, carotenoids, and many others.

In some embodiments, the composition can comprise components known to reduce methane production by methanogens, such as, for example, seaweed (e.g., *Asparagopsis taxiformis*); kelp; 3-nitrooxypropanol; anthraquinones; ionophores (e.g., monensin and/or lasalocid); polyphenols (e.g., saponins, tannins); *Yucca schidigera* extract (steroidal saponin-producing plant species); *Quillaja saponaria* extract (triterpenoid saponin-producing plant species); organosulfurs (e.g., garlic extract); flavonoids (e.g., quercetin, rutin, kaempferol, naringin, and anthocyanidins; bioflavonoids from green citrus fruits, rose hips and black currants); carboxylic acid; and/or terpenes (e.g., d-limonene, pinene and citrus extracts).

In one embodiment, the composition is preferably formulated for application to soil, seeds, whole plants, or plant parts (including, but not limited to, roots, tubers, stems, stalks, buds, flowers and leaves). In certain embodiments, the composition is formulated as, for example, liquid, dust, granules, microgranules pellets, wettable powder, flowable powder, emulsions, microcapsules, oils, or aerosols.

To improve or stabilize the effects of the composition, it can be blended with suitable adjuvants and then used as such or after dilution, if necessary. In preferred embodiments, the composition is formulated as a liquid, a concentrated liquid, or as dry powder or granules that can be mixed with water and other components to form a liquid product.

In one embodiment, the composition can comprise glucose (e.g., in the form of molasses), glycerol and/or glycerin, as, or in addition to, an osmoticum substance, to promote osmotic pressure during storage and transport of the dry product.

The compositions can be used either alone or in combination with other compounds and/or methods for efficiently enhancing plant health, growth and/or yields, and/or for supplementing the growth of the microbes. For example, in one embodiment, the composition can include and/or can be applied concurrently with nutrients and/or micronutrients for enhancing plant and/or microbe growth, such as magnesium, phosphate, nitrogen, potassium, selenium, calcium, sulfur, iron, copper, and zinc; and/or one or more prebiotics, such as kelp extract, fulvic acid, chitin, humate and/or humic acid. In some embodiments, the microorganisms of the composition produce and/or provide these substances. The exact materials and the quantities thereof can be determined by a grower or an agricultural scientist having the benefit of the subject disclosure.

The compositions can also be used in combination with other agricultural compounds and/or crop management systems. In one embodiment, the composition can optionally comprise, or be applied with, for example, natural and/or chemical pesticides, repellants, herbicides, fertilizers, water treatments, non-ionic surfactants and/or soil amendments. Preferably, however, the composition does not comprise and/or is not used with benomyl, dodecyl dimethyl ammonium chloride, hydrogen dioxide/peroxyacetic acid, imazalil, propiconazole, tebuconazole, or triflumizole. if the composition is mixed with compatible chemical additives, the chemicals are preferably diluted with water prior to addition of the subject composition.

Further components can be added to the composition, for example, buffering agents, carriers, other microbe-based compositions produced at the same or different facility, viscosity modifiers, preservatives, nutrients for microbe growth, tracking agents, biocides, other microbes, surfactants, emulsifying agents, lubricants, solubility controlling agents, pH adjusting agents, preservatives, stabilizers and ultra-violet light resistant agents.

The pH of the microbe-based composition should be suitable for the microorganism of interest. In a preferred embodiment, the pH of the composition is about 3.5 to 7.0, about 4.0 to 6.5, or about 5.0.

Optionally, the composition can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C.

The microbe-based compositions may be used without further stabilization, preservation, and storage, however. Advantageously, direct usage of these microbe-based compositions preserves a high viability of the microorganisms, reduces the possibility of contamination from foreign agents and undesirable microorganisms, and maintains the activity of the by-products of microbial growth.

In other embodiments, the composition can be placed in containers of appropriate size, taking into consideration, for example, the intended use, the contemplated method of application, the size of the fermentation vessel, and any mode of transportation from microbe growth facility to the location of use. Thus, the containers into which the microbe-based composition is placed may be, for example, from 1 pint to 1,000 gallons or more. In certain embodiments the containers are 1 gallon, 2 gallons, 5 gallons, 25 gallons, or larger.

Modes of Application

Advantageously, in preferred embodiments, the microbe-based compositions according to the subject invention are non-toxic and can be applied in high concentrations without causing irritation to, for example, the skin or digestive tract of a human or other non-pest animal. Thus, the subject invention is particularly useful where application of the microbe-based compositions occurs in the presence of living organisms, such as growers and livestock.

As used herein, "applying" a composition or product to a site refers to contacting a composition or product with a site such that the composition or product can have an effect on that site. The effect can be due to, for example, microbial growth and colonization, and/or the action of a metabolite, enzyme, biosurfactant or other microbial growth by-product. The mode of application depends upon the formulation of the composition, and can include, for example, spraying, pouring, sprinkling, injecting, spreading, mixing, dunking, fogging and misting. Formulations can include, for example, liquids, dry and/or wettable powders, flowable powders, dusts, granules, pellets, emulsions, microcapsules, steaks, oils, gels, pastes and/or aerosols. In an exemplary embodiment, the composition is applied after the composition has been prepared by, for example, dissolving the composition in water.

In some embodiments, prior to applying the composition to a tract of farmland, the method comprises assessing the site for local conditions, determining a preferred formulation for the composition (e.g., the type, combination and/or ratios of microorganisms and/or growth by-products) that is customized for the local conditions, and producing the composition with the preferred formulation.

The local conditions can include, for example, soil conditions (e.g., soil type, species of soil microbiota, amount and/or type of soil organic content, amount and/or type of GHG precursor substrates in the soil, amount and/or type of fertilizers or other soil additives or amendments present); crop and/or plant conditions (e.g., types, numbers, age and/or health of plants being grown); environmental conditions (e.g., current climate, season, or time of year); amount and type of GHG emissions at the site; mode and/or rate of application of the composition, and others as are relevant to the site.

After assessment, a preferred formulation for the composition can be determined so that the composition can be customized for these local conditions. The composition can then be cultivated, preferably at a microbe growth facility that is within 300 miles of the site of application, preferably within 200 miles, even more preferably within 100 miles.

In some embodiments the local conditions are assessed periodically, for example, once annually, biannually, or even monthly. In this way, the composition formula can be modified in real time as necessary to meet the unique needs of the changing local conditions.

In one embodiment, the site to which the composition is applied is the soil (or rhizosphere) in which plants will be planted or are growing (e.g., a crop, a field, an orchard, a grove, a pasture/prairie or a forest). The compositions of the subject invention can be pre-mixed with irrigation fluids, wherein the compositions percolate through the soil and can be delivered to, for example, the roots of plants to influence the root microbiome.

In one embodiment, the compositions are applied to soil surfaces, with or without water, where the beneficial effect of the soil application can be activated by rainfall, sprinkler, flood, or drip irrigation.

In one embodiment, the site is a plant or plant part. The composition can be applied directly thereto as a seed treatment or to the surface of a plant or plant part (e.g., to the surface of the roots, tubers, stems, flowers, leaves, fruit, or flowers). In a specific embodiment, the composition is contacted with one or more roots of the plant. The composition can be applied directly to the roots, e.g., by spraying or dunking the roots, and/or indirectly, e.g., by administering the composition to the soil in which the plant grows (or the rhizosphere). The composition can be applied to the seeds of the plant prior to or at the time of planting, or to any other part of the plant and/or its surrounding environment.

In one embodiment, wherein the method is used in a large scale setting, such as a large pasture or agricultural crop, the method can comprise administering the composition into a tank connected to an irrigation system used for supplying water, fertilizers, pesticides or other liquid compositions. Thus, the plant and/or soil surrounding the plant can be treated with the composition via, for example, soil injection, soil drenching, using a center pivot irrigation system, with a spray over the seed furrow, with micro-jets, with drench sprayers, with boom sprayers, with sprinklers and/or with drip irrigators. Advantageously, the method is suitable for treating hundreds of acres of land.

In one embodiment, wherein the method is used in a smaller scale setting, such as in a smaller farm or livestock ranch, the method can comprise applying the composition using a handheld lawn and garden sprayer or spreader, and/or using a handheld watering can.

Plants and/or their environments can be treated at any point during the process of cultivating the plant. For example, the composition can be applied to the soil prior to, concurrently with, or after the time when seeds are planted therein. It can also be applied at any point thereafter during the development and growth of the plant, including when the plant is flowering, fruiting, and during and/or after abscission of leaves.

Carbon Footprint Reduction

Advantageously, in certain embodiments, the subject invention provides solutions that improve the environmental sustainability of producing and consuming biofuels, for example, reducing land use change; reducing dependence on fossil fuels for transportation and agricultural production; promoting plant-based and animal-based feedstock growth and vitality; improving the nutritional content of agricultural and pastureland soils; promoting improved soil moisture and water use efficiency; enhancing soil microbiome diversity; reducing fertilizer usage; reducing enteric GHG emissions from livestock animals and manure; improving feed efficiency; improving nutritional quality of meat and milk; and others.

In preferred embodiments, the methods of the subject invention are useful for reducing the carbon footprint of producing biofuels and biodiesels.

As used herein, "reduction" refers to a negative alteration, and the term "increase" refers to a positive alteration, wherein the negative or positive alteration is at least 0.01%, 0.1%, 0.25%, 0.5%, 1%, 5%, 10%, 15%, 20%, 25%, 30%, 35%, 40%, 45%, 50%, 55%, 60%, 70%, 75%, 80%, 85%, 90%, 95%, or 100%.

In some embodiments, the desired reduction is achieved within a relatively short time period, for example, within 1 week, 2 weeks, 3 weeks or 4 weeks. In some embodiments, the desired reduction is achieved within, for example, 1 month, 2 months, 3 months, 4 months, 5 months or 6 months after employing the subject methods. In some embodiments, the desired reduction is achieved within 1 year, 2 years, 3 years, 4 years, or 5 years after employing the subject methods.

In some embodiments, the reduction in carbon footprint according to the subject methods is achieved via enhanced vegetative carbon utilization and storage, as well as increased carbon sequestration in soil. For example, the enhanced vegetative carbon utilization can be in the form of, for example, increased foliage in plants, increased stem and/or trunk diameter, enhanced root growth, and/or increased numbers of plants.

Additionally, the increased soil sequestration can be in the form of, for example, increased plant root growth, increased uptake by microorganisms of organic compounds secreted by plants (including secretions from plant roots) and improved microbial colonization of soil and roots.

In one specific embodiment, the method reduces atmospheric carbon dioxide. By increasing plant biomass above and below ground, the plants act as carbon sinks by fixing carbon during photosynthesis and storing carbon as biomass. Furthermore, the increased plant root biomass not only increases the root structures upon which microbes can settle, but increases the secretion rates and the amounts of sugar and other nutrients exuded from the plant roots, which feed the applied and native microbial biomass. The microbes in turn convert plant-based materials to increased levels of carbon stored in the soil. Thus, the stimulated microbial population below-ground (both added and native) further serves as a storage system for carbon. In a specific embodiment, the microbial cell biomass is yeast biomass.

In certain embodiments, the reduction in carbon footprint is achieved via improved agricultural fertilization practices and improved agricultural soil management.

The improved agricultural fertilization practices can be in the form of, for example, a reduction of nitrogen-rich fertilizers, as well as replacement of some or all fertilizers, pesticides, and/or other soil amendments with a composition comprising one or more environmentally-friendly soil microorganisms. Advantageously, reducing fertilizer and other chemical applications reduces the amount of these chemicals that pollute soils and ground water when left unabsorbed by plants, and further reduces their runoff into other water sources. Furthermore, reducing fertilizer applications reduce the amount of nitrous oxide and carbon dioxide soil emissions resulting from such applications.

In some embodiments, improved agricultural fertilization can be in the form of utilizing manure produced by livestock animals to fertilize farmland in which plants that will be used as biofuel feed stock and/or livestock feed are, or will be, growing. In certain embodiments, the soil treatment composition can be mixed with manure while it is being stored. The microorganisms can facilitate increased decomposition of manure while reducing the amount of GHG emitted therefrom, e.g., methane, carbon dioxide and/or nitrous oxide. For example, in one embodiment, the composition can exhibit antibacterial properties against the methanogens when the composition comprises a biosurfactant and/or a microorganism that produces biosurfactants. In another embodiment, when the composition comprises a killer yeast, e.g., *Wickerhamomyces anomalus*, the composition can be effective at controlling methanogenic microorganisms due to the exotoxins secreted by the killer yeast.

Furthermore, in some embodiments, applying the composition to manure enhances the value of the manure as an organic fertilizer due to the ability of the microorganisms to inoculate the soil of farmland to which the manure is eventually applied. Because the livestock that produced the manure would have increased feed nitrogen utilization, their waste would produce less nitrogen and ammonia; thus, the circular effects include lower carbon footprint fertilizers and reduced need for synthetic nitrogen-rich fertilizers.

The subject methods can increase the above- and below-ground biomass of plants, including, for example, increased foliage volume, increased stem and/or trunk diameter, enhanced root growth and/or density, and/or increased numbers of plants. In one embodiment, this is achieved by improving the overall hospitability of the rhizosphere in which a plant's roots are growing, for example, by improving the nutrient and/or moisture retention properties of the rhizosphere.

Accordingly, the subject invention can benefit revegetation and/or restoration of farmlands depleted due to anthropogenic causes, such as over-grazing by livestock, logging, commercial, urban and/or residential development, and/or dumping. In some embodiments, the amount of vegetation is depleted due to fire, disease or other natural and/or environmental stressors.

Additionally, in one embodiment, the method can be used to inoculate soil and/or a plant's rhizosphere with a beneficial microorganism. The microorganisms of the subject microbe-based compositions can promote colonization of the roots and/or rhizosphere, as well as the vascular system of the plant, by, for example, aerobic bacteria, yeasts, and/or fungi.

In certain embodiments, the method can be used to remove nitrous oxide directly from the air and/or soil. For example, certain microorganisms according to the subject invention (e.g., *Dyadobacter fermenters*) are capable of reducing nitrous oxide into nitrogen in soil without denitrification. Denitrification is the reduction of nitrates and nitrites into molecular nitrogen. The intermediates of the reduction process include nitrogen oxide products, such as nitrous oxide, which can leak into the atmosphere.

In one embodiment, the promotion of colonization can lead to improved biodiversity of the soil microbiome. As used herein, improving the biodiversity refers to increasing the variety of microbial species within the soil. Preferably, improved biodiversity comprises increasing the ratio of aerobic bacterial species, yeast species, and/or fungal species to anaerobic microorganisms in the soil.

For example, in one embodiment, the microbes of the subject composition can colonize roots, the soil and/or the rhizosphere and encourage colonization of other nutrient-fixing microbes, such as *Rhizobium* and/or *Mycorrhizae*, and other endogenous and/or exogenous microbes that promote plant biomass accumulation.

In one embodiment, soil biodiversity and root colonization can be further enhanced through the application of a biostimulant, or a substance that promotes increased growth rates of a microorganism, to the soil.

In one embodiment, improved soil biodiversity promotes enhanced nutrient solubilization and/or uptake. For example, certain aerobic bacterial species can acidify the soil and solubilize NPK fertilizers into plant-usable forms.

In yet another embodiment, the method can be used to fight off and/or discourage colonization of the rhizosphere by soil microorganisms that are deleterious or that might compete with beneficial soil microorganisms. For example, when more aerobic microorganisms are present in the soil, less anaerobic microorganisms, such as nitrate-reducing microorganisms, can thrive and produce deleterious atmospheric by-products, such as nitrous oxide.

In one embodiment, the method can be used for enhancing penetration of beneficial molecules through the outer layers of root cells, for example, at the root-soil interface of the rhizosphere.

The subject invention can be used to improve any number of qualities of any type of soil, for example, clay, sandy, silty, peaty, chalky, loam soil, and/or combinations thereof. Furthermore, the methods and compositions can be used for improving the quality of dry, waterlogged, porous, depleted, compacted soils and/or combinations thereof. Soil can include the soil present in the rhizosphere or soil that lies outside of the rhizosphere.

In one embodiment, the method can be used for improving the drainage and/or dispersal of water in waterlogged soils. In one embodiment, the method can be used for improving water retention in dry soil.

In one embodiment, the method can be used for improving nutrient retention in porous and/or depleted soils.

In one embodiment, the method can be used for improving the structure and/or nutrient content of eroded soils.

In one embodiment, the method can be used to reduce and/or replace a chemical or synthetic fertilizer, wherein the composition comprises a microorganism capable of fixing, solubilizing and/or mobilizing nitrogen, potassium, phosphorous (or phosphate) and/or other micronutrients in soil.

In certain embodiments, the reduction in deleterious atmospheric gases is achieved via a reduction in methanogenic microbes of both animal and environmental origin. The reduction of methanogenic microbes can be in the form of, for example, enhanced management and disposal of manure and/or organic waste, as well as enhanced land and crop management.

In one embodiment, the animal husbandry aspect of the method reduces the carbon footprint of the biofuel industry by enhancing the health and/or productivity of livestock animals that may serve as feedstock sources themselves, in ways that reduce GHG emissions resulting from digestion, manure and highly concentrated mass-production of livestock.

These benefits can include, for example, improved feed efficiency, which results in improved animal health and fertility, improved quantity and nutritional quality of meat and dairy products, and reduced dependency on high-carbon footprint feed crops, such as transported grains. One specific and important benefit of improved feed efficiency is increased feed nitrogen usage, which results in reduced ammonia and nitrous oxide produced in the digestive system and waste products of livestock.

In one embodiment, the transportation aspect of the method reduces the carbon foot print of the biofuel industry by reducing dependence on non-renewable resources for moving biofuels and/or producing biofuels.

In some embodiments, the methods of the subject invention can be utilized by a grower, biofuel producer, livestock producer or livestock feed provider for reducing carbon credit usage. Thus, in certain embodiments, the subject methods can further comprise conducting measurements to assess the effect of the method on reducing the generation of carbon dioxide and/or other deleterious atmospheric gases, and/or precursors thereof (e.g., nitrogen and/or ammonia), using standard techniques in the art.

Measurements can be conducted at a certain time point after application of the microbe-based composition to a tract of farmland. In some embodiments, the measurements are conducted after about 1 week or less, 2 weeks or less, 3 weeks or less, 4 weeks or less, 30 days or less, 60 days or less, 90 days or less, 120 days or less, 180 days or less, and/or 1 year or less.

Furthermore, the measurements can be repeated over time. In some embodiments, the measurements are repeated daily, weekly, monthly, bi-monthly, semi-monthly, semi-annually, and/or annually.

In certain embodiments, assessing GHG generation can take the form of measuring GHG emissions from a site. Gas chromatography and electron capture are commonly used for testing samples in a lab setting. In certain embodiments, GHG emissions can also be conducted in the field, using, for example, flux measurements and/or in situ soil probing. Flux measurements analyze the emission of gases from the soil surface to the atmosphere, for example, using chambers that enclose an area of soil and then estimate flux by observing the accumulation of gases inside the chamber over a period of time. Probes can be used to generate a soil gas profile, starting with a measurement of the concentration of the gases of interest at a certain depth in the soil, and comparing it directly between probes and ambient surface conditions (Brummell and Siciliano 2011, at 118).

Measuring GHG emissions can also comprise other forms of direct emissions measurement and/or analysis of fuel input. Direct emissions measurements can comprise, for example, identifying polluting operational activities (e.g., fuel-burning automobiles) and measuring the emissions of those activities directly through Continuous Emissions Monitoring Systems (CEMS). Fuel input analysis can comprise calculating the quantity of energy resources used (e.g., amount of electricity, fuel, wood, biomass, etc., consumed) determining the content of, for example, carbon, in the fuel source, and applying that carbon content to the quantity of the fuel consumed to determine the amount of emissions.

In certain embodiments, carbon content of a site where plants are growing, e.g., agricultural site, crop, sod or turf farm, pasture/prairie or forest, can be measured by, for example, quantifying the aboveground and/or below-ground biomass of plants. In general, the carbon concentration of, for example, a tree, is assumed to be from about 40 to 50% of the biomass.

Biomass quantification can take the form of, for example, harvesting plants in a sample area and measuring the weight of the different parts of the plant before and after drying. Biomass quantification can also be carried out using non-destructive, observational methods, such as measuring, e.g., trunk diameter, height, volume, and other physical parameters of the plant. Remote quantification can also be used, such as, for example, laser profiling and/or drone analysis.

In some embodiments, carbon content of a site can further comprise sampling and measuring carbon content of litter, woody debris and/or soil of a sampling area. Soil, in particular, can be analyzed, for example, using dry combustion to determine percent total organic carbon (TOC); by potassium permanganate oxidation analysis for detecting active carbon; and by bulk density measurements (weight per unit volume) for converting from percent carbon to tons/acre.

In some embodiments, measuring GHG levels from livestock can be conducted according to known methods in the art (see, e.g., Storm et al. 2012, incorporated herein by reference), including, for example, gas capture and quantification, chromatography, respiration chambers (which measure the amount of methane exhaled by an individual animal), and in vitro gas production technique (where feed is fermented under controlled laboratory and microbial conditions to determine amount of methane and/or nitrous oxide is emitted per gram of dry matter). The measurements can also come in the form of testing the microbial population in an animal, for example, by sampling milk, feces, and/or stomach contents and using, for example, DNA sequencing and/or cell plating to determine the number of methanogenic microbes present therein.

Measurements can be conducted at a certain time point after application of the microbe-based composition. In some embodiments, the measurements are conducted after about 1 week or less, 2 weeks or less, 3 weeks or less, 4 weeks or less, 30 days or less, 60 days or less, 90 days or less, 120 days or less, 180 days or less, and/or 1 year or less.

Furthermore, the measurements can be repeated over time. In some embodiments, the measurements are repeated daily, weekly, monthly, bi-monthly, semi-monthly, semi-annually, and/or annually.

Growth of Microbes According to the Subject Invention

The subject invention utilizes methods for cultivation of microorganisms and production of microbial metabolites and/or other by-products of microbial growth. The subject invention further utilizes cultivation processes that are suitable for cultivation of microorganisms and production of microbial metabolites on a desired scale. These cultivation processes include, but are not limited to, submerged cultivation/fermentation, solid state fermentation (SSF), and modifications, hybrids and/or combinations thereof.

As used herein "fermentation" refers to cultivation or growth of cells under controlled conditions. The growth could be aerobic or anaerobic. In preferred embodiments, the microorganisms are grown using SSF and/or modified versions thereof.

In one embodiment, the subject invention provides materials and methods for the production of biomass (e.g., viable cellular material), extracellular metabolites (e.g. small molecules and proteins), residual nutrients and/or intracellular components (e.g. enzymes and other proteins).

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, humidity, microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of organisms in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method can provide oxygenation to the growing culture. One embodiment utilizes slow motion of air to remove low-oxygen containing air and introduce oxygenated air. In the case of submerged fermentation, the oxygenated air may be ambient air supplemented daily through mechanisms including impellers for mechanical agitation of liquid, and air spargers for supplying bubbles of gas to liquid for dissolution of oxygen into the liquid.

The method can further comprise supplementing the cultivation with a carbon source. The carbon source can be a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, canola oil, rice bran oil, olive oil, corn oil, sunflower oil, sesame oil, and/or linseed oil; etc. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, sodium chloride, calcium carbonate, and/or sodium carbonate. These inorganic salts may be used independently or in a combination of two or more.

In some embodiments, the method for cultivation may further comprise adding additional acids and/or antimicrobials in the medium before, and/or during the cultivation process. Antimicrobial agents or antibiotics are used for protecting the culture against contamination.

Additionally, antifoaming agents may also be added to prevent the formation and/or accumulation of foam during submerged cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the medium may be necessary.

The microbes can be grown in planktonic form or as biofilm. In the case of biofilm, the vessel may have within it a substrate upon which the microbes can be grown in a biofilm state. The system may also have, for example, the capacity to apply stimuli (such as shear stress) that encourages and/or improves the biofilm growth characteristics.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

In one embodiment, the subject invention further provides a method for producing microbial metabolites such as, for example, biosurfactants, enzymes, proteins, ethanol, lactic acid, beta-glucan, peptides, metabolic intermediates, polyunsaturated fatty acid, and lipids, by cultivating a microbe strain of the subject invention under conditions appropriate for growth and metabolite production; and, optionally, purifying the metabolite. The metabolite content produced by the method can be, for example, at least 20%, 30%, 40%, 50%, 60%, 70%, 80%, or 90%.

The microbial growth by-product produced by microorganisms of interest may be retained in the microorganisms or secreted into the growth medium. The medium may contain compounds that stabilize the activity of microbial growth by-product.

The biomass content of the fermentation medium may be, for example, from 5 g/l to 180 g/l or more, or from 10 g/l to 150 g/l.

The cell concentration may be, for example, at least $1 \times 10^6$ to $1 \times 10^{13}$, $1 \times 10^7$ to $1 \times 10^{12}$, $1 \times 10^8$ to $1 \times 10^{11}$, or $1 \times 10^9$ to $1 \times 10^{10}$ CFU/ml.

The method and equipment for cultivation of microorganisms and production of the microbial by-products can be performed in a batch, a quasi-continuous process, or a continuous process.

In one embodiment, all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells, spores, conidia, hyphae and/or mycelia remains in the vessel as an inoculant for a new cultivation batch. The composition that is removed can be a cell-free medium or contain cells, spores, or other reproductive propagules, and/or a combination of thereof. In this manner, a quasi-continuous system is created.

Advantageously, the method does not require complicated equipment or high energy consumption. The microorganisms of interest can be cultivated at small or large scale on site and utilized, even being still-mixed with their media.

Advantageously, the microbe-based products can be produced in remote locations. The microbe growth facilities may operate off the grid by utilizing, for example, solar, wind and/or hydroelectric power.

Preparation of Microbe-Based Products

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

One microbe-based product of the subject invention is simply the fermentation medium containing the microorganisms and/or the microbial metabolites produced by the microorganisms and/or any residual nutrients. The product of fermentation may be used directly without extraction or purification. If desired, extraction and purification can be easily achieved using standard extraction and/or purification methods or techniques described in the literature.

The microorganisms in the microbe-based products may be in an active or inactive form, or in the form of vegetative cells, reproductive spores, conidia, mycelia, hyphae, or any other form of microbial propagule. The microbe-based products may also contain a combination of any of these forms of a microorganism.

In one embodiment, different strains of microbe are grown separately and then mixed together to produce the microbe-based product. The microbes can, optionally, be blended with the medium in which they are grown and dried prior to mixing.

In one embodiment, the different strains are not mixed together, but are applied to a plant and/or its environment as separate microbe-based products.

The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

Upon harvesting the microbe-based composition from the growth vessels, further components can be added as the harvested product is placed into containers or otherwise transported for use. The additives can be, for example, buffers, carriers, other microbe-based compositions produced at the same or different facility, viscosity modifiers, preservatives, nutrients for microbe growth, surfactants, emulsifying agents, lubricants, solubility controlling agents, tracking agents, solvents, biocides, antibiotics, pH adjusting agents, chelators, stabilizers, ultra-violet light resistant agents, other microbes and other suitable additives that are customarily used for such preparations.

In one embodiment, buffering agents including organic and amino acids or their salts, can be added. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

The pH of the microbe-based composition should be suitable for the microorganism(s) of interest. In a preferred embodiment, the pH of the composition is about 3.5 to 7.0, about 4.0 to 6.5, or about 5.0.

In one embodiment, additional components such as an aqueous preparation of a salt, such as sodium bicarbonate or carbonate, sodium sulfate, sodium phosphate, sodium biphosphate, can be included in the formulation.

In certain embodiments, an adherent substance can be added to the composition to prolong the adherence of the product to plant parts. Polymers, such as charged polymers, or polysaccharide-based substances can be used, for example, xanthan gum, guar gum, levan, xylinan, gellan gum, curdlan, pullulan, dextran and others.

In preferred embodiments, commercial grade xanthan gum is used as the adherent. The concentration of the gum should be selected based on the content of the gum in the commercial product. If the xanthan gum is highly pure, then 0.001% (w/v—xanthan gum/solution) is sufficient.

In one embodiment, glucose, glycerol and/or glycerin can be added to the microbe-based product to serve as, for example, an osmoticum during storage and transport. In one embodiment, molasses can be included.

In one embodiment, prebiotics can be added to and/or applied concurrently with the microbe-based product to enhance microbial growth. Suitable prebiotics, include, for example, kelp extract, fulvic acid, chitin, humate and/or humic acid. In a specific embodiment, the amount of prebiotics applied is about 0.1 L/acre to about 0.5 L/acre, or about 0.2 L/acre to about 0.4 L/acre.

In one embodiment, specific nutrients are added to and/or applied concurrently with the microbe-based product to enhance microbial inoculation and growth. These can include, for example, soluble potash (K2O), magnesium, sulfur, boron, iron, manganese, and/or zinc. The nutrients can be derived from, for example, potassium hydroxide, magnesium sulfate, boric acid, ferrous sulfate, manganese sulfate, and/or zinc sulfate.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C.

Local Production of Microbe-Based Products

In certain embodiments of the subject invention, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

The microbe growth facilities of the subject invention can be located at the location where the microbe-based product will be used (e.g., a cattle ranch). For example, the microbe growth facility may be less than 300, 250, 200, 150, 100, 75, 50, 25, 15, 10, 5, 3, or 1 mile from the location of use.

Because the microbe-based product can be generated locally, without resort to the microorganism stabilization, preservation, storage and transportation processes of conventional microbial production, a much higher density of microorganisms can be generated, thereby requiring a smaller volume of the microbe-based product for use in the on-site application or which allows much higher density microbial applications where necessary to achieve the desired efficacy. This allows for a scaled-down bioreactor (e.g., smaller fermentation vessel, smaller supplies of starter material, nutrients and pH control agents), which makes the system efficient and can eliminate the need to stabilize cells or separate them from their culture medium. Local generation of the microbe-based product also facilitates the inclusion of the growth medium in the product. The medium can contain agents produced during the fermentation that are particularly well-suited for local use.

Locally-produced high density, robust cultures of microbes are more effective in the field than those that have remained in the supply chain for some time. The microbe-based products of the subject invention are particularly advantageous compared to traditional products wherein cells have been separated from metabolites and nutrients present in the fermentation growth media. Reduced transportation times allow for the production and delivery of fresh batches of microbes and/or their metabolites at the time and volume as required by local demand.

The microbe growth facilities of the subject invention produce fresh, microbe-based compositions, comprising the microbes themselves, microbial metabolites, and/or other components of the medium in which the microbes are grown. If desired, the compositions can have a high density of vegetative cells or propagules, or a mixture of vegetative cells and propagules.

In one embodiment, the microbe growth facility is located on, or near, a site where the microbe-based products will be used (e.g., a citrus grove), for example, within 300 miles, 200 miles, or even within 100 miles. Advantageously, this allows for the compositions to be tailored for use at a specified location. The formula and potency of microbe-based compositions can be customized for specific local conditions at the time of application, such as, for example, which soil type, plant and/or crop is being treated; what season, climate and/or time of year it is when a composition is being applied; and what mode and/or rate of application is being utilized.

Advantageously, distributed microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated medium and metabolites in which the cells are originally grown.

Furthermore, by producing a composition locally, the formulation and potency can be adjusted in real time to a specific location and the conditions present at the time of application. This provides advantages over compositions that are pre-made in a central location and have, for example, set ratios and formulations that may not be optimal for a given location.

The microbe growth facilities provide manufacturing versatility by their ability to tailor the microbe-based products to improve synergies with destination geographies. Advantageously, in preferred embodiments, the systems of the subject invention harness the power of naturally-occurring local microorganisms and their metabolic by-products to improve GHG management.

The cultivation time for the individual vessels may be, for example, from 1 to 7 days or longer. The cultivation product can be harvested in any of a number of different ways.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

REFERENCES

Gerber, P. J., et al. (2013). "Tackling climate change through livestock—A global assessment of emissions and mitigation opportunities." Food and Agriculture Organization of the United Nations, Rome. Viewed Apr. 5, 2019. http://www.fao.org/3/i3437e/i3437e.pdf. ("Gerber et al. 2013").

Grossi, G., et al. (2019). "Livestock and climate change: impact of livestock on climate and mitigation strategies." *Animal Frontiers*, Volume 9, Issue 1, Pages 69-76. https://academic.oup.com/af/article/9/1/69/5173494. ("Grossi et al. 2019").

Government of Western Australia. (2018). "Carbon farming: reducing methane emissions from cattle using feed additives." https://www.agric.wa.gov.au/climate-change/carbon-farming-reducing-methane-emissions-cattle-using-feed-additives. ("Carbon Farming 2018").

Holtshausen, L. et al. (2009). "Feeding saponin-containing *Yucca schidigera* and *Quillaja saponaria* to decrease enteric methane production in dairy cows." J. Dairy Sci. 92:2809-2821.

Ishler, V. A., (2016). "Carbon, Methane Emissions and the Diary Cow." Penn State College of Agricultural Sciences. https://extension.psu.edukarbon-methane-emissions-and-the-dairy-cow. ("Ishler 2016").

Pidwirny, M. (2006). "The Carbon Cycle". *Fundamentals of Physical Geography, 2nd Edition*. Viewed Oct. 1, 2018. http://www.physicalgeography.net/fundamentals/9r.html. ("Pidwirny 2006").

Storm, Ida M. L. D., A. L. F. Hellwing, N. I. Nielsen, and J. Madsen. (2012). "Methods for Measuring and Estimating Methane Emission from Ruminants." *Animals* (*Basel*). June 2(2): 160-183. doi: 10.3390/ani2020160.

United States Environmental Protection Agency. (2016). "Climate Change Indicators in the United States." https://www.epa.gov/sites/productionaes/2016-08/documents/climate_indicators_2016.pdf. ("EPA Report 2016").

United States Environmental Protection Agency. (2016). "Overview of Greenhouse Gases." *Greenhouse Gas Emissions*. https://www.epa.govighgemissions/overview-greenhouse-gases. ("Greenhouse Gas Emissions 2016").

Center for Sustainable Systems, University of Michigan. (2020). "Carbon Footprint Factsheet." Pub. No. CSS09-05. http://css.umich.edu/factsheets/carbon-footprint-factsheet. ("Michigan 2020").

We claim:

1. A method for producing reduced carbon footprint biofuels, wherein the method comprises an agricultural aspect and a production aspect, wherein:

the agricultural aspect comprises cultivating farmland in which plants that will serve as biofuel feedstock are, or will be, grown using at least one technique that: enhances soil nutrient and moisture content and dispersion, enhances plant health and growth, reduces nitrogen-rich fertilizer usage, reduces soil greenhouse gas emissions, and/or enhances carbon sequestration in soil and/or plant matter; and the production aspect comprises harvesting the plants as feedstock and converting the feedstock into a biofuel or biofuel component, wherein the agricultural aspect results in reduced greenhouse gas emissions compared with traditional agricultural techniques, thereby reducing the carbon footprint of producing biofuel feedstocks and/or biofuels, and wherein the techniques for growing the plants comprise applying a microbe-based soil treatment composition comprising one or more soil colonizing microorganisms and/or microbial growth by-products to the farmland, wherein the one or more microorganisms are selected from *Trichoderma harzianum, Bacillus amyloliquefaciens*, Meyerozyma MEC14XN, *Meyerozyma guillermondii* and *Wickerhamomyces anomalus*.

2. The method of claim 1, wherein the microorganisms are selected from one or more of *Bacillus amyloliquefaciens* NRRL B-67928, *Trichoderma harzianum*, and *W. anomalus* Y-68030.

3. The method of claim 1, wherein the composition further comprises fermentation medium in which the one or more microorganisms were cultivated.

4. The method of claim 1, wherein the microbial growth by-product is a biosurfactant selected from glycolipids and lipopeptides.

5. The method of claim 4, wherein the glycolipid is selected from sophorolipids, mannosylerythritol lipids, rhamnolipids and trehalose lipids.

6. The method of claim 4, wherein the lipopeptide is selected from surfactin, iturin, fengycin, arthrofactin and lichenysin.

7. The method of claim 1, wherein the production aspect comprises fermenting the feedstock to produce an alcohol selected from ethanol, methanol, butanol and propanol, wherein the alcohol is the biofuel.

8. The method of claim 1, wherein the production aspect comprises extracting a lipid-rich oil from the feedstock and subjecting the oil to transesterification to produce fatty acid methyl esters, wherein the fatty acid methyl esters are a biodiesel biofuel.

9. The method of claim 1, further comprising an animal husbandry aspect, wherein the animal husbandry aspect comprises making the plants grown according to the agricultural aspect available to a livestock animal so that the livestock animal ingests the plants.

10. The method of claim 9, wherein the livestock animals are placed on the farmland to graze the plants.

11. The method of claim 9, wherein the plants are harvested from the farmland and provided to the livestock animals as reduced-carbon footprint fodder and/or grains.

12. The method of claim 11, wherein the reduced-carbon footprint fodder comprises grasses, forbs, shrubs, hay, straw, alfalfa, fruits, nuts, seeds, vegetables and/or crop residue.

13. The method of claim 8, wherein the reduced-carbon footprint grains comprise corn, oats, wheat, barley, sorghum, milo, and/or soy.

14. The method of claim 9, wherein the production aspect comprises slaughtering the livestock animal after ingestion of the plants, rending a liquid fat product from by-products of the animals' carcass, and subjecting the fat to transesterification to produce fatty acid methyl esters, wherein the fatty acid methyl esters are a biodiesel biofuel.

15. The method of claim 1, further comprising a transportation aspect, wherein the transportation aspect comprises using the biofuel to power agricultural equipment and/or vehicles utilized in transporting the biofuel.

16. The method of claim 1, wherein the agricultural aspect results in reduced emissions of carbon dioxide, methane and/or nitrous oxide from soil.

17. The method of claim 1, wherein the one or more microorganisms of the composition colonize the soil and/or roots of plants growing in the soil, and wherein the colonization causes:

an increase in foliar volume, stem diameter, trunk diameter, root growth, and/or numbers of the plants;

an increase in protein content in the plant;

an increase in microbial biomass in the soil;

improved soil biodiversity; and increased uptake of organic plant secretions by microorganisms.

18. The method of claim 17, wherein improved biodiversity comprises increasing the ratio of aerobic bacterial species, yeast species, and/or fungal species in the soil to anaerobic microorganisms in the soil.

19. The method of claim 17, wherein atmospheric carbon dioxide is reduced by enhancing vegetative carbon utilization and storage.

20. The method of claim 17, wherein carbon sequestration is enhanced.

* * * * *